United States Patent [19]

Fernandes et al.

[11] Patent Number: 5,555,357
[45] Date of Patent: Sep. 10, 1996

[54] COMPUTER SYSTEM AND METHOD FOR GENERATING AND MANIPULATING CHARTS AND DIAGRAMS

[75] Inventors: Antonio M. Fernandes, Monte Sereno, Calif.; Charles F. Good, Milford, Ohio; Craig S. Young, Zephyr Cove, Nev.

[73] Assignee: Claris Corporation, Santa Clara, Calif.

[21] Appl. No.: 253,981

[22] Filed: Jun. 3, 1994

[51] Int. Cl.$^6$ .................................................. G06F 15/62
[52] U.S. Cl. ................................................................. 395/141
[58] Field of Search .................................... 395/141, 140, 395/155, 161, 129, 131, 132, 125; 345/179, 173

[56] References Cited

U.S. PATENT DOCUMENTS 5,347,620  9/1994  Zimmer .................................... 395/129

*Primary Examiner*—Phu K. Nguyen
*Attorney, Agent, or Firm*—Carr, DeFilippo & Ferrell

[57] ABSTRACT

A central processing unit (CPU) is coupled to a display device, an input device, a data storage device and a memory with charting and diagramming tools, element records, connector records, and display routines. The memory is used by the CPU to present a user interface on the display and for generating chart elements in response to inputs from the user. The CPU displays a user interface that allows automatic generation and connection of new drawing elements. Methods are disclosed for creating drawing elements of a flowchart, creating drawing elements of a flowchart at a selected position, creating drawing elements of an organizational chart, and displaying a portion of the display in a visually distinct manner.

26 Claims, 33 Drawing Sheets

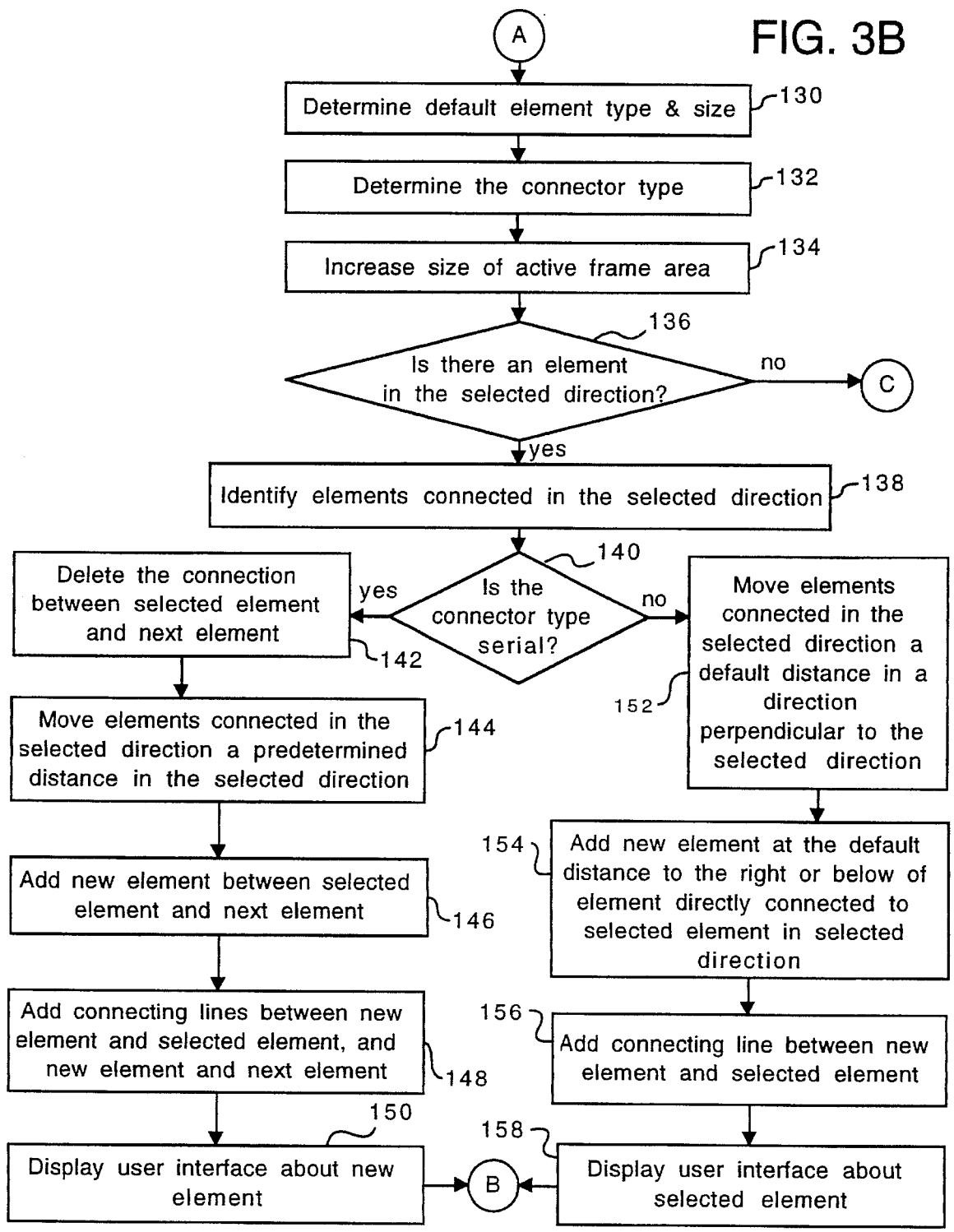

COMPUTER SYSTEM AND METHOD FOR GENERATING AND MANIPULATING CHARTS AND DIAGRAMS

BACKGROUND OF THE INVENTION

1. Field of the Invention

The present invention relates generally to systems for creating, modifying and manipulating charts and diagrams using computers. In particular, the present invention relates to a system and methods for producing and displaying controls for the automatic generation of chart and diagram elements. The present invention also relates to systems and methods for displaying active portions of a display in a visually distinct manner.

2. Description of the Related Art

The use of personal computers has become widespread for a variety of functions and applications in business and education. One such application of computers is their use for producing, printing and displaying graphical images. Still more particularly, a variety of application programs have been developed for creating flowcharts, organizational charts and various other diagrams. Such existing systems provide for the creation of various drawing elements and their interconnection. For example, there are a variety of very complex computer aided design or drafting programs for creating any type of mechanical, electrical and architectural drawings. There are also more simplistic drawing programs for creating only flowcharts or only organizational charts.

One major problem with the existing flowcharting and drawing programs is that they are very difficult to use. The complex computer aided design programs usually require a significant amount of training to be used and are typically only used by skilled draftspersons. Even the more simplistic drawing programs with reduced functionality are cumbersome and difficult to use. For example, existing systems require a number of key strokes or inputs from a mouse type controller to created a simple shape or symbol in a chart, such as a rectangular box. To create a flowchart symbol, a symbol is first chosen from the symbol palette or menu displayed on a monitor. The symbol is then dragged and dropped using a mouse type controller into a desired position in the drawing. Alternatively, the symbol could be created and positioned using various other keystrokes or combinations of keystrokes and mouse inputs. Once the symbol has been added, it typically must be connected with other elements in the drawing. This requires similar manipulations of the input device to add a simple connecting line. Having to repeatedly reposition the cursor from one area of the drawing to a palette or menu for adding each element or changing the functionality provided by manipulation of the cursor is highly inefficient. Creating and printing such drawings is therefore very labor intensive and time consuming. Thus, there is needed for system the makes drawing elements easier to create.

A number of drawing programs have increased the functionality they provide with the ability to create in a single drawing various charts types such as bar charts, graphs, flowcharts and organizational charts. As with other prior art drawing programs, these multiple chart type drawing programs suffer from the problems of being cumbersome to use. Because the sets of tools available for use with each chart type varies, these multiple chart type programs have increased complexity which makes them more difficult to use. A particular problem for such drawing programs with multiple chart types is effectively identifying the portions of a drawing upon which particular tools operate. Since the elements of a drawing upon which a tool can operate are not effectively identified, the user must engage in a trial and error process that wastes time and makes the drawing programs difficult to use.

Therefore, there is a need for a system and methods providing for the automatic generation and connection of chart and diagram elements that significantly simplifies the process of creating charts and diagrams. Further, there is a need for a system and method for displaying active portions of the display in a visually distinct manner so that the user can quickly recognize the portion of a display device that is active.

SUMMARY OF THE INVENTION

The present invention overcomes the limitations and shortcomings of the prior art with a system and methods for interactively generating and manipulating drawing elements. The system of the present invention includes a central processing unit (CPU) that is coupled to a display device, an input device, a data storage device and a memory. The memory advantageously comprises: an operating system, charting and diagramming tools, element records, connector records, display routines, a memory for storing an active frame and a plurality of graphic files. These elements forming the memory are used by the CPU to present a user interface on the display and for generating chart elements in response inputs from the user. The CPU under direction of routines in the memory displays one of a plurality of user interfaces that allows automatic generation and connection of new drawing elements. The CPU also uses the routines in memory to create and modify element records and connection records. The system of the present invention for automatically generating drawing elements is particularly advantageous because it is easy to use, it organizes and connects drawing elements automatically, and it displays the active area of a display in a visually distinct manner.

The present invention also comprises methods for creating drawing elements of a flowchart, for creating drawing elements of an organizational chart, and for displaying a portion of the display in a visually distinct manner. The preferred method of the present invention for automatically creating elements of a flowchart comprises the steps of: displaying the user interface about a selected element; receiving an input from the user; determining a direction in which a new drawing element is to be added; determining whether any drawing elements exist in the selected direction; moving any existing drawing elements; adding a new drawing element; and connecting the new drawing element to the adjacent existing drawing elements.

BRIEF DESCRIPTION OF THE DRAWINGS

FIGS. 3A, 3B and 3C, are a flowchart of the preferred method for automatically generating a flowchart element according to the present invention;

DETAILED DESCRIPTION OF THE PREFERRED EMBODIMENTS

Figure 1:
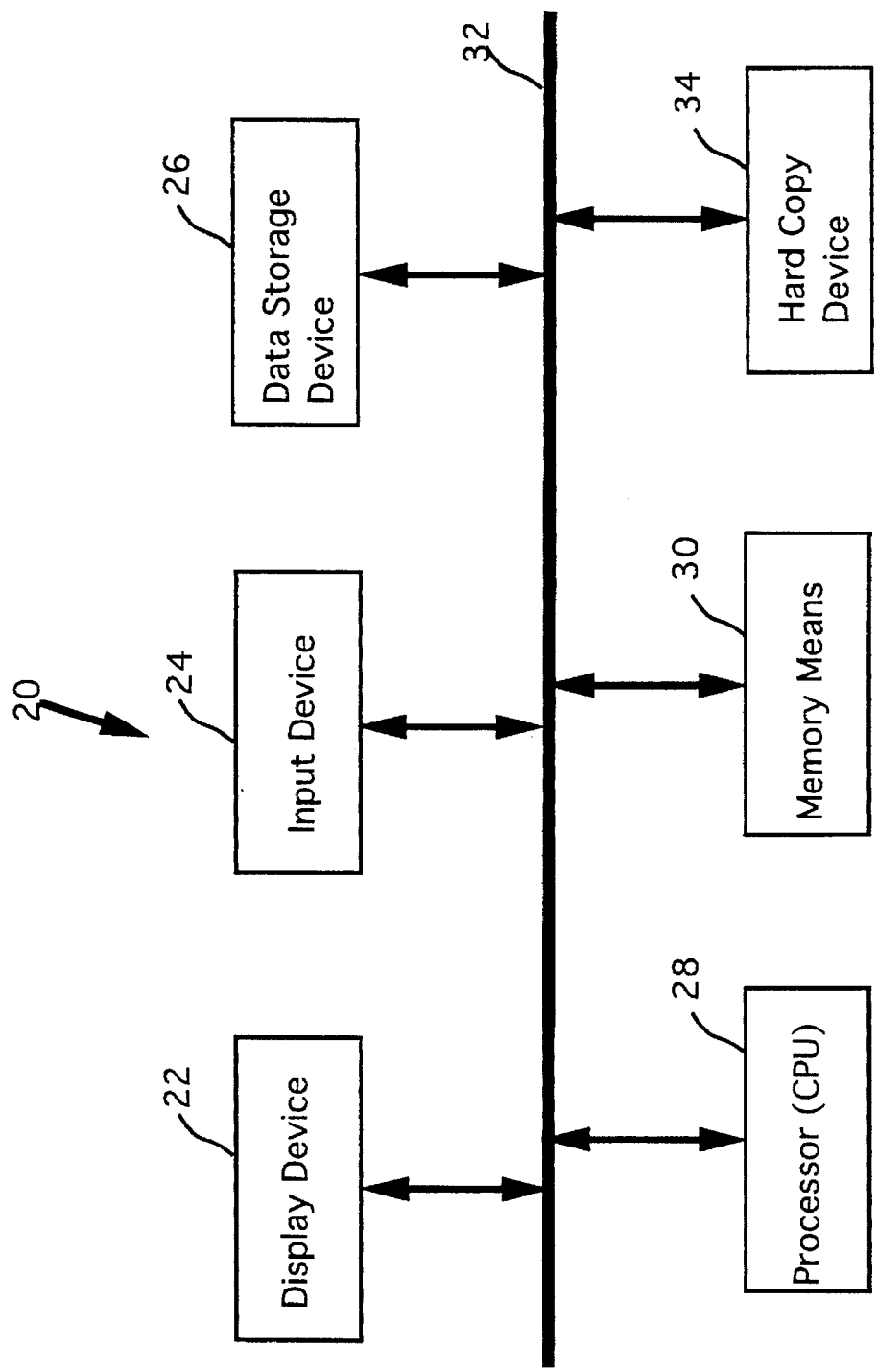
FIG. 1 is a block diagram of a preferred embodiment of the system of the present invention for generating and manipulating charts and diagrams.

Referring now to FIG. 1, a block diagram of a preferred embodiment of a graphics generation and manipulation system 20 constructed in accordance with the present invention is shown. The graphics generation and manipulation system 20 preferably comprises a display device 22, an input device 24, a data storage device 26, a central processing unit (CPU) 28, and a memory means 30. The central processing unit (CPU) 28, display device 22, input device 24, and memory 30 are coupled in a von Neuman architecture via a bus 32 such as in a personal computer. The central processing unit 28 is preferably a microprocessor such as a Motorola 68040; the display device 22 is preferably a video monitor; and the input device 24 is preferably a keyboard and mouse type controller. The CPU 28 is also coupled to a hard copy device 30 such as a laser printer, in a conventional manner. In an exemplary embodiment, the system 20 is a Macintosh Quadra 800 computer. Those skilled in the art will realize that the system 20 could also be implement on an IBM personal computer.

The graphics generation and manipulation system 20 of the present invention displays a variety of images that are used to simplify the process of creating flowcharts and various other types of diagrams. The CPU 24, under the guidance of instructions received from the memory means 30 and from the user through the input device 24, provides signals for the display of data on the display device 22. In one aspect of the present invention, the system 20 presents on a screen 58 of the display device 22 a means or automatic generation user interface 72 for automatically generating a new element of a drawing as shown for an exemplary flowchart 70 in FIG. 6A. The automatic generation user interface 72 comprises a plurality of directional control buttons 76, 78, 80 and 82. These buttons 76, 78, 80 and 82 provide additional functionality that allows the user to automatically generate a drawing element or object in the direction desired by selecting a button 76, 78, 80 and 82. In response to selection of one of the directional control buttons 76, 78, 80 and 82, the system 20 generates a new drawing element, moves existing drawing elements to provide space in the drawing for the new element, and interconnects the new drawing element to existing drawing elements. In another aspect of the present invention, the active frame or area of the display is shown in a visually distinct manner as in an exemplary group of charts of FIG. 10A. These features in combination with the existing functionality of drawing programs greatly simplifies their use.

Figure 2:
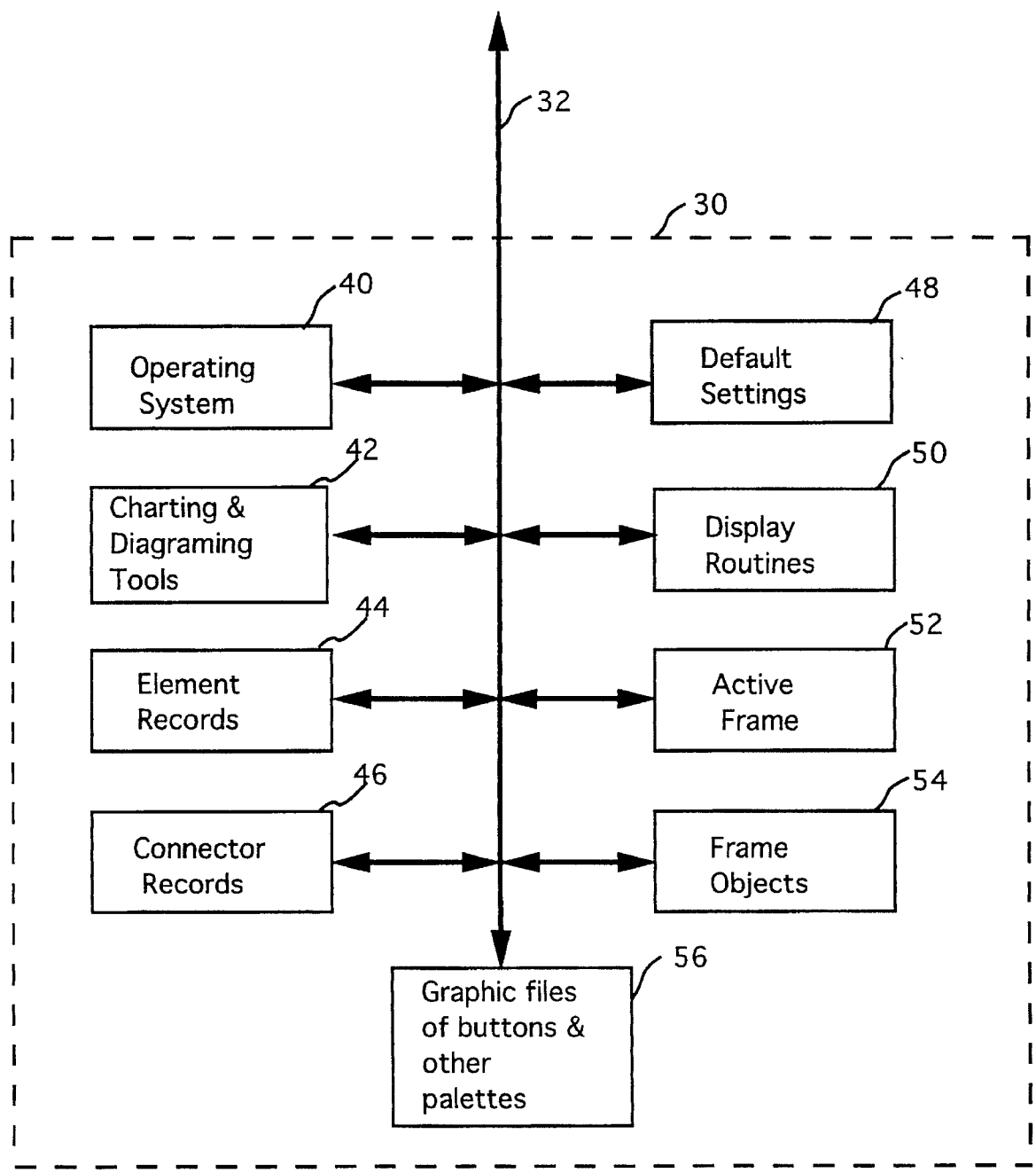
FIG. 2 is a block diagram of a preferred embodiment of the memory of the present invention for generating and manipulating charts and diagrams.

Referring now to FIG. 2, a preferred embodiment of the memory means 30 is shown. The memory means 30 is preferably constructed with random access memory (RAM) and read-only memory (ROM). The memory 30 includes an operating system 40, charting and diagramming tools 42, element records 44, connector records 46, default settings 48, display routines 50, an active frame memory 52, frame objects 54 and a memory for storing graphic files 56. The charting and diagramming tools 42 are used to create a conventional environment for creating charts and diagrams. The system 20 of the present invention displays an additional interface on the display device 22 using the graphic files 56 and the display routines 50. The additional interface enables the user to quickly and easily create new elements of a drawing. The system 20 stores the data forming a drawing such as drawing elements in the element records 44. The other routines of the present invention are used to create new element records 44 and connecting records 46. Those skilled in the art will realize that various equivalent combinations of memories and registers can achieve the same results when used in accordance with the present invention. For example, while the memory blocks 40, 42, 44, 46, 48, 50, 52, 54 and 56 are shown as separate, they can easily comprise different regions of a contiguous space in memory.

The operating system 40 is preferably a conventional personal computer operating system such as System 7.1 for the Macintosh by Apple Computer. Alternatively, the present invention could use a conventional operating system such as DOS and Windows sold by Microsoft Corporation. The operating system 40 provides for creation of operation windows or areas of the display and recognizes manipulation of a mouse type controller and keyboard. Those skilled in the art will realize that application programs and the present invention provide commands to the operating system, and thus, the processor 28 to control operation of the system 20.

The charting and diagramming tools 42 are preferably a sub-system or application program for generating and editing charts and drawings. The charting and diagramming tools 42 are preferably a drawing application program that provides the ability to generate several different types of charts such as flowcharts, organizational charts, bar charts, pie charts, etc. in a single drawing. In an exemplary embodiment, the charting and diagramming tools 42 are any one of the existing application programs for creating business graphics known to those skilled in the art. The charting and diagramming tools 42 control the CPU 28 to produce a window or working display area on the display device 22. The CPU under direction and control of the charting and diagramming tools 42 displays a plurality of pull down menus and tool palettes for performing operations and functions in response to user manipulation of the input device 24. The operations include the creation, display, resizing and movement of drawing elements including symbols, lines, text and other various chart elements. The charting and diagramming tools 42 are distinguishable from the prior art because they include additional routines for automatically generating element records 44 and elements of a drawing as is described in detail below with reference to FIGS. 3A–3C and 4A–4D. The functionality of an exemplary embodiment is disclosed in the ClarisImpact User's Guide published by Claris Corporation of Santa Clara, Calif. and which is incorporated herein by reference.

The present invention preferably stores the data defining a drawing in element records 44. Each element record 44 preferably stores information for one element that forms a portion of the drawing. The element record 44 includes the type of the element, the position of the element, size of the element and also information about the format, style and other characteristics to be used when displaying the element on the display device 22 or when printing the element on the hard copy device 34. In the preferred embodiment, each element record 44 provides a plurality of fields for storing data about its respective element. Those skilled in the art will realize that other fields may be added to each element record 44 beyond those specifically enumerated above. The element records 44 are preferably stored in memory 30 as a linked list. The memory 30 also includes an area for storing connector records 46. Connectors are a particular type of element that is used to provide a connecting line between two other elements. Each connecting record 46 stores the information in data fields that fully describe each connector. For example, the connector records 46 include information specifying the two elements that are connected, the connection type between the two elements and other information about the format, style and other display and printing characteristics of the connector.

Still referring to FIG. 2, it can be seen that the memory 30 includes default settings 48, display routines 150, an active frame memory 152, frame objects 54 and graphic files 156. The default settings 48 identify the connector type, the element type, the frame, as well as other information need for automatic generation of elements. Such other information need for automatic generation of elements includes default spacing between elements, spacing for assistant type elements, layout options, element attributes, etc. The display routines 44 are used to control the CPU 24 for displaying element record data and other data as detailed in FIGS. 6A–10C. The display routines 44 are used with the graphic files 54 to present the data to the user in a conventional what-you-see-is-what-you-get (WYSIWYG) manner. The display routines 50 are also used to display the active frame in a visually distinct manner as shown in FIGS. 10A–10C. The present invention advantageously provides an environment where several charts or drawings having different types may be create, edited and used in a single window or drawing region. However, only one chart type and its corresponding set of tools is available for use at a particular instant. Each of the chart types has a corresponding frame object. The frame object 54 stores a list of element records 44 associated with the frame. Thus, through the use of frame objects 54, the system 20 identifies the elements in a window that belong or are associated with that drawing or chart type. Moreover, the frame object specifies the elements upon which the system 20 can operate and the tools that can be used. The active frame memory 52 preferably stores a reference to the frame object of a drawing that is active and other information about the type of the frame object. The frame objects 54 are also stored in a corresponding frame object memory 54.

Figure 5:
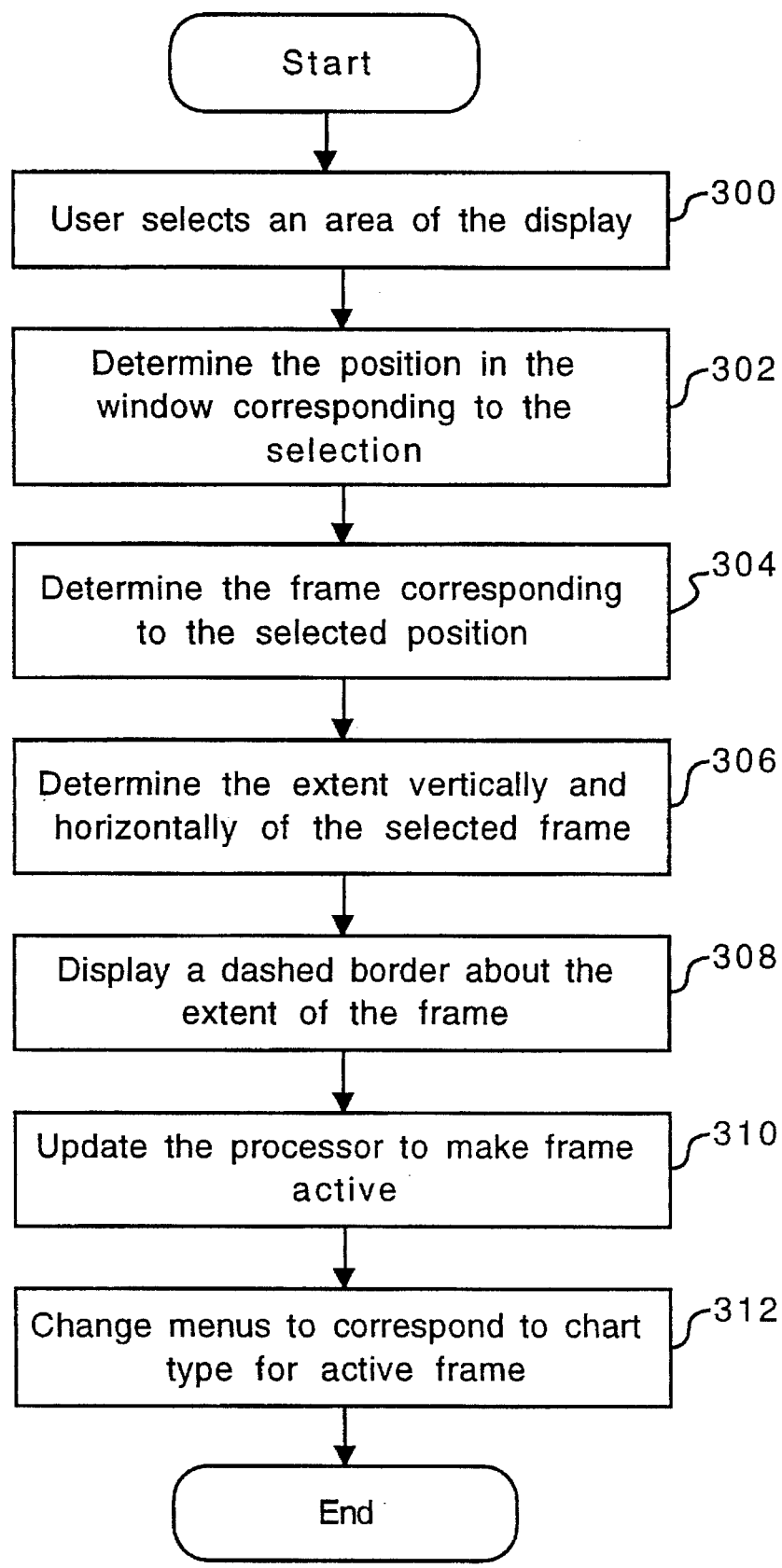
FIG. 5 is a flowchart of the preferred method for updating the display to delineate the active frame.
Figure 6A:
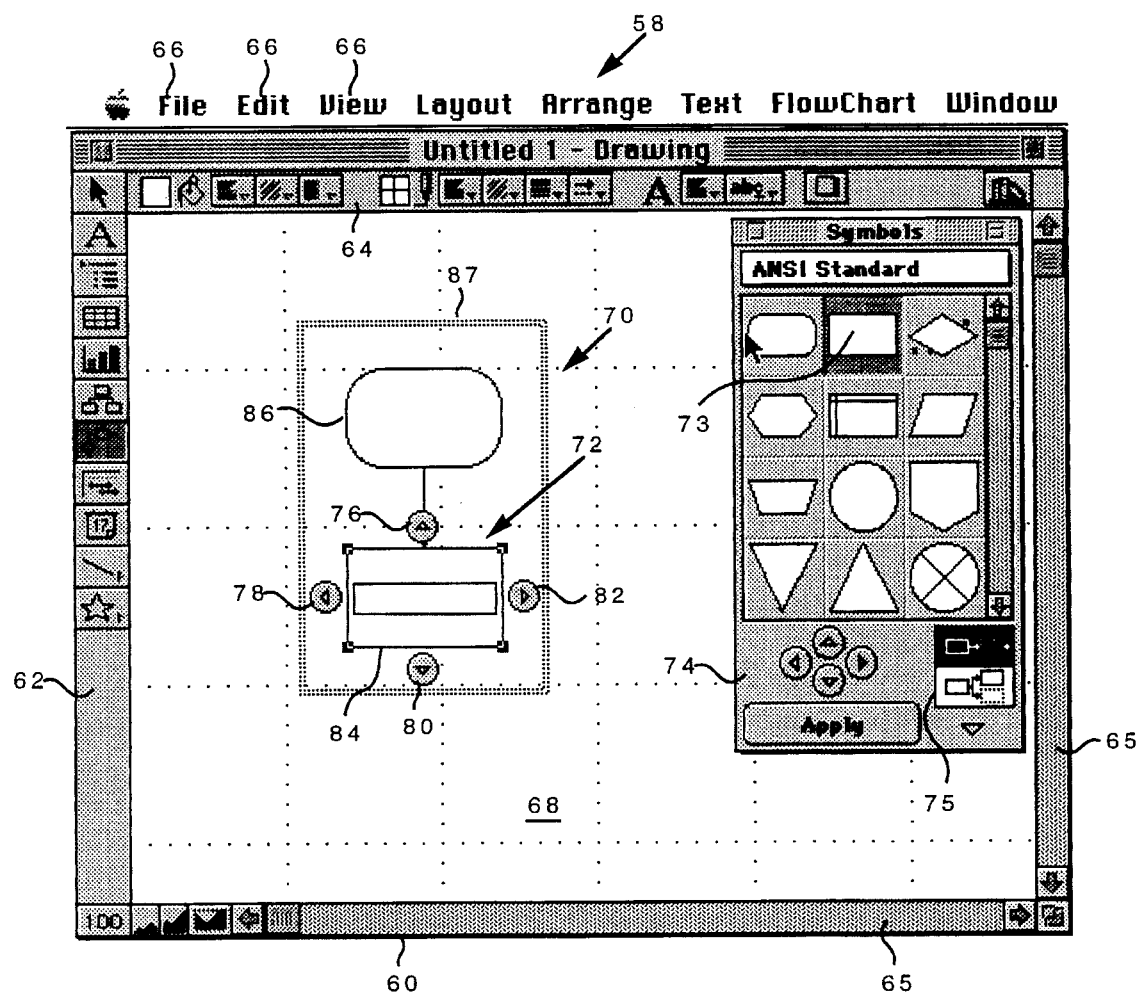
FIGS. 6A, 6B, 6C, 6D and 6E are a graphical representations of the display device showing a first user interface for a drawing generation and manipulation tool of the present invention and resulting flowcharts produced by use of the tool.

A first automatic generation interface 72 is shown in FIG. 6A. FIG. 6A illustrates a graphical representation of a screen 58 of the display device 22 showing a window 60, a vertical tool bar 62, a horizontal style bar 64, a plurality of pull down menus 66 and drawing portion of the window 68. FIG. 6A also shows a flowchart 70 and a floating symbol palette 74. The first automatic generation user interface 72 is preferably used for adding drawing elements to flowcharts. As shown in FIG. 6A, the first automatic generation user interface 72 includes a top button 76, a left button 78, a bottom button 80 and a right button. These buttons 76, 78, 80 and 82 provide additional functionality that allows the user to automatically generate a drawing element in the direction desired by selecting a button 76, 78, 80 and 82. The operation of the system 20 of the present invention is described in more detail below with reference to FIGS. 3A–3C, 4A–4D and 5.

Referring now to FIGS. 3A–3C, 4A–4D and 5, the preferred methods of the present invention will now be described. The present invention includes a method for automatically generating elements of a flowchart, a method for automatically generating elements of an organizational chart, and a method for displaying an active frame of a drawing in a visually distinct manner. These methods along with the unique user interfaces provided, make the present invention much easier and simple to use for creating a variety of different types of business charts and diagrams.

Figure 3A:
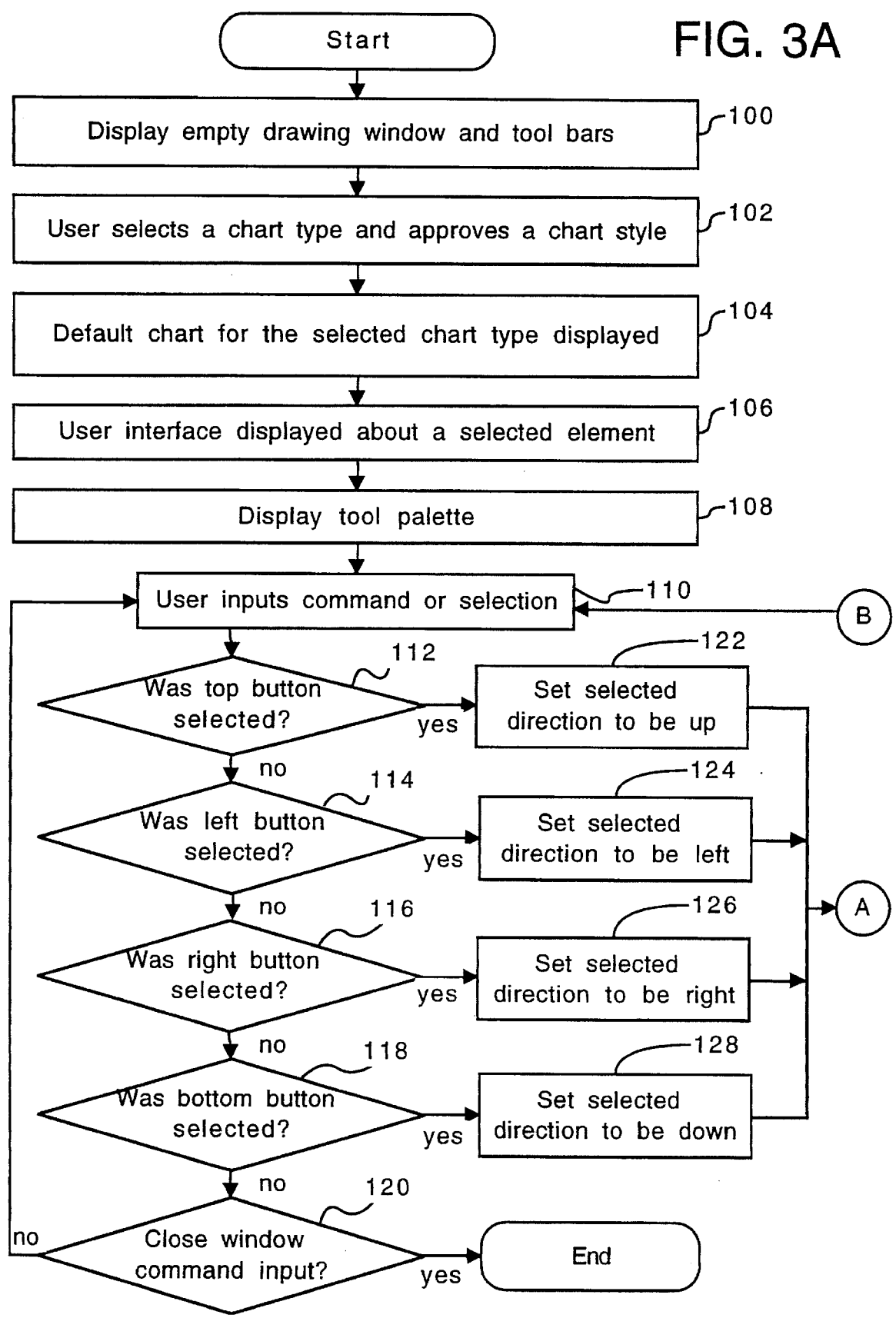
Figure 3C:
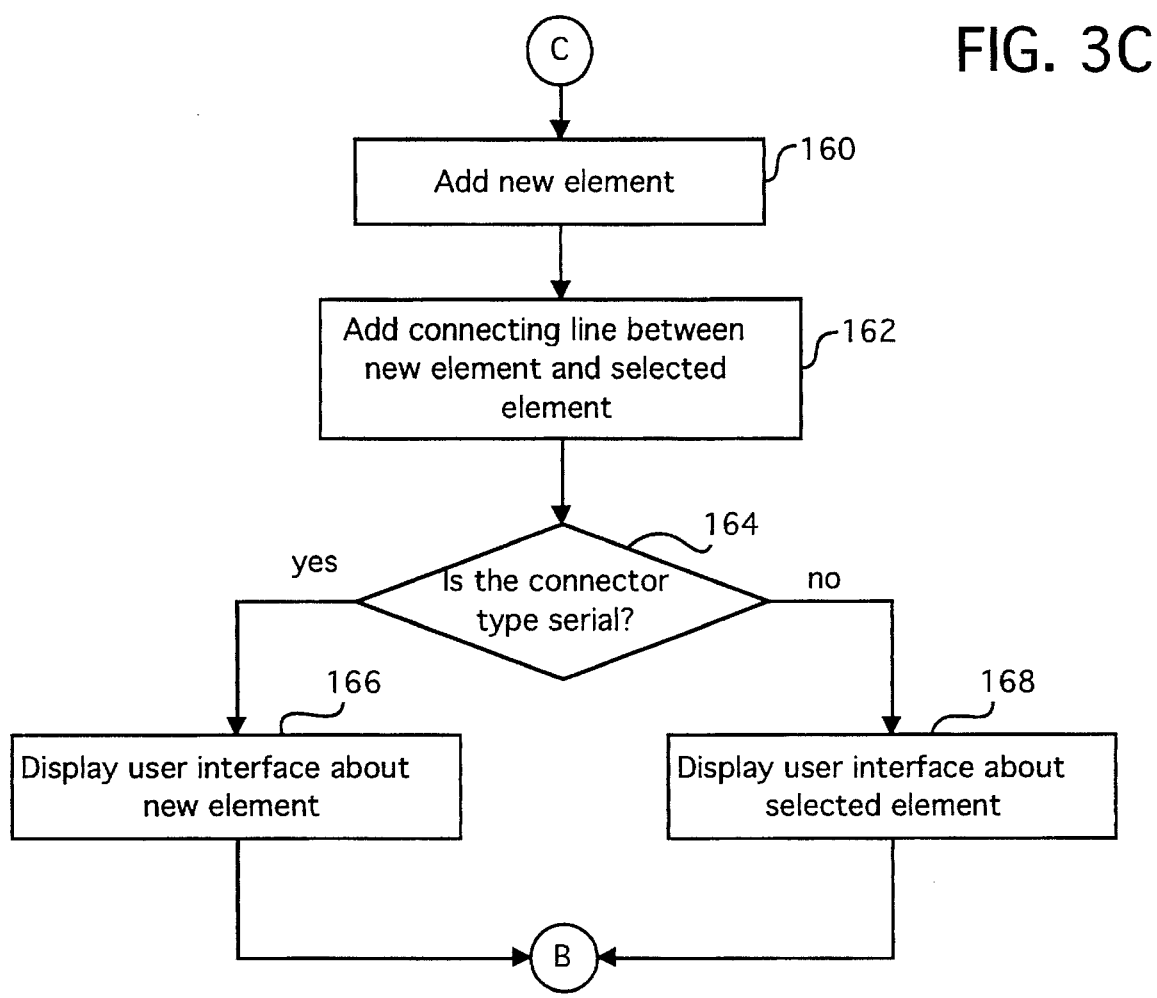

Referring now to FIGS. 3A–3C, a flowchart of the preferred method for automatically generating elements of a flowchart are shown. The method begins by producing a tool bar, a style bar, scroll bars, menus and an empty window on the display device 22 in step 100 of FIG. 3A. An exemplary embodiment of the display device 22 is FIG. 6A without the flowchart 70 and the symbol palette 74. This is done in a conventional manner using the operating system 40 and charting and diagramming tools 42 as will be recognized by those skilled in the art. Next in step 102, the user selects a chart type. The user may select a chart type by positioning the cursor over a tool in the tool bar and clicking the mouse. Alternatively, the user may select a chart type using keystrokes or using the mouse to select a type from a pull down window. In the preferred embodiment, the user then moves the cursor to the drawing portion of the window and clicks the mouse. Then the method continues by displaying a dialog box that presents a series of pre-defined styles for the chart type the user has selected to create. The user may then select a style for the chart to be created and approves the selection using the input device 24. Next in step 104, a default chart having the style selected is created on the drawing portion 68 of the window 60. Those skilled in the art will realize that steps 102 and 104 can be omitted in situations where a chart is already in existence and user selects a particular element to modify such as by double clicking on an existing flowchart element. Then in step 106, the first automatic generation interface 72 is displayed about a selected element in the flowchart. The default chart preferably has a single flowchart or drawing element and the first automatic generation interface 72 is displayed about this chart element. This chart element and its corresponding element record 44 are also set to be the selected element.

Then in step 108, the symbol palette 74 is displayed on the screen 58 in the window 60 proximate the chart 70.

The user may now input any one of a variety of commands or selections to create, edit or manipulate drawing elements. These selections and commands are input and received by the system 20 in step 110. These commands may include conventional commands provided by drawing programs and are accessed in a conventional manner using keystrokes and/or mouse movements. The conventional commands are processed by the CPU 28 under control of the charting and diagramming tools 42 in a conventional manner. For example, conventional commands include the selecting an element, resizing of an element, the movement of an element or adding text to an element.

However, the present invention also has the ability to process automatic generation commands specified by the selection of one of the directional control buttons 76, 78, 80 and 82 for flowchart type diagrams. In steps 112, 114, 116 and 188, the method of the present invention determines if any one of the four directional control buttons 76, 78, 80 and 82 provided in this embodiment of the present invention has been selected. In particular, in step 112, the method determines whether the top button 76 was selected. If the top button 76 was selected by the user, the method proceeds to step 122 where the selected direction is set to be up. Then the method continues in step 130 of FIG. 3B. If the top button 76 was determined not to be selected by the user in step 112, then the method moves to step 114 to test whether the left button 78 was selected. If the left button 78 was selected by the user, the method proceeds to step 124 where the selected direction is set to be left. After step 124, the method continues in step 130 of FIG. 3B. If the left button 78 was found not to be selected by the user in step 114, then the method moves to step 116. In step 116, the method determines whether the right button 82 was selected. If the right button 82 was selected by the user, the method proceeds to step 126 where the selected direction is set to be right, and then the method continues in step 130 of FIG. 3B. If the right button 82 was found not to be selected by the user in step 116, then the method tests for a final directional control button by determining whether the bottom button 80 was selected in step 118. If the bottom button 80 was selected by the user, the method proceeds to step 128 where the selected direction is set to be down, and then the method proceeds in step 130 of FIG. 3B. While the determination of the button 76, 78, 80 and 82 selected by the user has been described above as occurring in a predetermined order, those skilled in the art will realize that the testing step of 112, 114, 116, and 118 and the corresponding setting of the selected direction could be performed in other orderings. If the bottom button 80 was not selected, the method proceeds from step 118 to step 120 to determine if the close window command was input. If the close window command was not input, the method returns to step 110 to received and process additional user inputs. If the close window command was input, then the user has completed editing and manipulation of the drawing and the method is complete.

In step 130 of FIG. 3B, the method determines the default settings of the system 20 for the type of element to be added, the size of the element to be added and the default settings for the spacing between drawing elements in the vertical and horizontal directions. The CPU 28 under control of the routines of the present invention reads this data from the default settings memory 48. As shown in FIG. 6A, the default type for the element is shown in the symbol palette 74 and may be changed by the user. The other default setting may also be changed or set by the user. They are accessible to the user through a set of dialog boxes responsive the inputs from the input device 24.

Next in step 132, the method determines the default connector type by reading the default settings from memory 30. The connector for connecting drawing elements may take a variety of different formats. For example, the connections may be angled, straight, made from center of element to center of element, from left side to left side, from top center to bottom center, etc. Additionally, the present invention also provides a serial connection type and a parallel connection type for flowcharts. The serial connection type creates a serial connection between the existing elements in the drawing and the new element to be created such that the new element is inserted between existing elements. The parallel connection type creates a parallel connection between the selected element in the drawing and the new element to be created such that the new element is added as a branch from the selected element.

Next in step 134, the size of the active frame is increased. The charting and diagramming tools 42 provide several different environments or frames, and each frame corresponds to a different chart type that is being created. There may be multiple frames in a drawing, however, only one frame may be active at any particular instant. Each of the frames has defined boundaries. Thus, when a new drawing element is to be added, the size of the active frame must be increased to accommodate the new element. Using the default values for the spacing and size of the new element, the system 20 increases the active frame by an amount necessary in the selected direction for addition of the new element. Then in step 136, the method determines whether there are any drawing elements in the selected direction. This can be determined by comparing the coordinates and size of the selected element to the other elements in the drawing. If there are elements in the selected direction, the method continues in step 138 by identifying the elements in the selected direction. Next in step 140, the method tests whether the default connection type determined in step 132 is serial. If the connection type is serial, the method proceeds to step 142, and if the connection type is parallel (not serial), the method proceeds to step 152.

In step 142, the preferred method deletes the connection or connector element between the selected element and the next element in the selected direction. The present invention accomplishes this by deleting and editing the connector records 46. Then in step 144, the method moves the elements connected in the selected direction a predetermined distance in the selected direction. The elements moved are those identified in step 138. Their relative positions to each other are maintained and they are moved in the selected direction by an amount sufficient to add the new element. Thus, the predetermined distance is the sum of the default size of the new element and two times the default spacing between elements in the selected direction. Then in step 146, a new element is generated using the routines provided by the charting and diagramming tools 42. A new element record 44 corresponding to the new element is generated and stored in memory 44. The new element has a default type and size as was determined in step 130. In step 148, connecting lines are added between the selected element and the new element, and between the new element and the existing elements that were connected to the selected element before the new element was inserted. Finally, in step 150, the first automatic generation interface 72 is displayed about the newly created element, and the first automatic generation interface 72 is removed from being displayed about the selected element. Since an element has now been automatically generated and inserted by the system 20 of the present invention, the method returns to step 110 to receive additional command via the input device 24.

In step 152, the preferred method moves the elements connected in the selected direction (i.e., the elements identified in step 138) a predetermined distance in a direction perpendicular to the selected direction. Their relative positions to each other are maintained. For example, in an exemplary embodiment when the selected direction is right or left, the existing elements are moved upward. When the selected direction is up or down, the existing elements are moved leftward. The identified elements are moved a predetermined distance. The predetermined distance is preferably the sum of the size of the new element and the specified default spacing between elements for the direction perpendicular to the selected direction. Then in step 154, a new element is generated using the routines provided by the charting and diagramming tools 42. A new element record 44 corresponding to the new element is created and stored in memory 30. The new element has a type and size as determined in step 130. In the exemplary embodiment, the new element is positioned either to the right of the rightmost element or below the lowest element directly connected to the selected element in the selected direction. The new element is preferably positioned the default distance from the rightmost element or below the lowest element according to the setting of the selected direction. In step 156, a connecting line is added between the selected element and the new element. A new corresponding connector record is also created and stored in memory 46. Finally, in step 158, the first automatic generation interface 72 continues to be displayed about the selected element. The element has been automatically generated and inserted by the system 20, and the method returns to step 110 to receive additional commands via the input device 24.

Referring now to FIG. 3C, method steps for automatically generating a new element if there are no elements in the selected direction is shown. If there are no elements in the selected direction, the method transitions from step 136 of FIG. 3B to step 160 of FIG. 3C. In step 160, the method generates a new element and a corresponding element record 44 using the routines provided by the charting and diagramming tools 42. The new element is positioned the default distance away from the selected element in the selected direction. For example, if the selected direction is upward then the new element is positioned the default distance above the selected element. Then in step 162, a connecting line is added between the new element and the selected element. The connecting lines is of a form consistent with the default setting stored in memory 48. Next in step 164, the method tests whether the default connection type is serial. If the default connection type is serial, the method continues in step 166 to display the first automatic generation interface 72 about the newly created element, and removes the first automatic generation interface 72 from being displayed about the selected element. If the default connection type is not serial, the method displays the first automatic generation interface 72 about the selected element in step 168. After either step 166 or 168, the method returns to step 110 to accept additional inputs.

Referring now to FIGS. 6A–6E, a graphical representation of the display device 22 during operation of the system 20 of the present invention is shown. The differences between FIG. 6A and FIGS. 6B–6E illustrate the results of selection of the directional control buttons 76, 78, 80 and 82 and operation of the present invention. For ease of understanding like reference numerals have been used for like elements throughout FIGS. 6A–6E. FIG. 6A illustrates a graphical representation of the screen 58 of the display device 22 showing the plurality of pull down menus 66 and the window 60 having the vertical tool bar 62, the horizontal style bar 64, scroll bars 65 and the drawing portion 68. Within the drawing portion 68 of the window 60, a flowchart 70 and a floating symbol palette 74 are displayed. The example flowchart 70 has a first element 86 and a selected element 84. The selected element 84 is shown in a distinct manner with handles displayed at each corner of the selected element 84. There is also the first automatic generation user interface 72 displayed about the selected element 84. As shown in FIG. 6A, the first automatic generation user interface 72 includes directional control buttons such as a top button 76, a left button 78, a bottom button 80 and a right button 82. Each of the buttons 76, 78, 80 and 82 is shown centered proximate a respective side of the selected element 84. For example, the top button 76 is centered just above the selected element 84. The symbol palette 74 illustrates several different symbols or chart elements that the charting and diagramming tools 42 can generate. The symbol palette 74 displays a selected default symbol in a visually distinct manner such as rectangular box 73. The symbol palette 74 also displays the connection type that has been selected as the default with a pair of icons 75, the one being selected shown with a black background. FIG. 6A also shows how the system 20 of the present invention delineates the active frame area 87 with a pair of dotted lines in a rectangular shape.

Figure 6B:
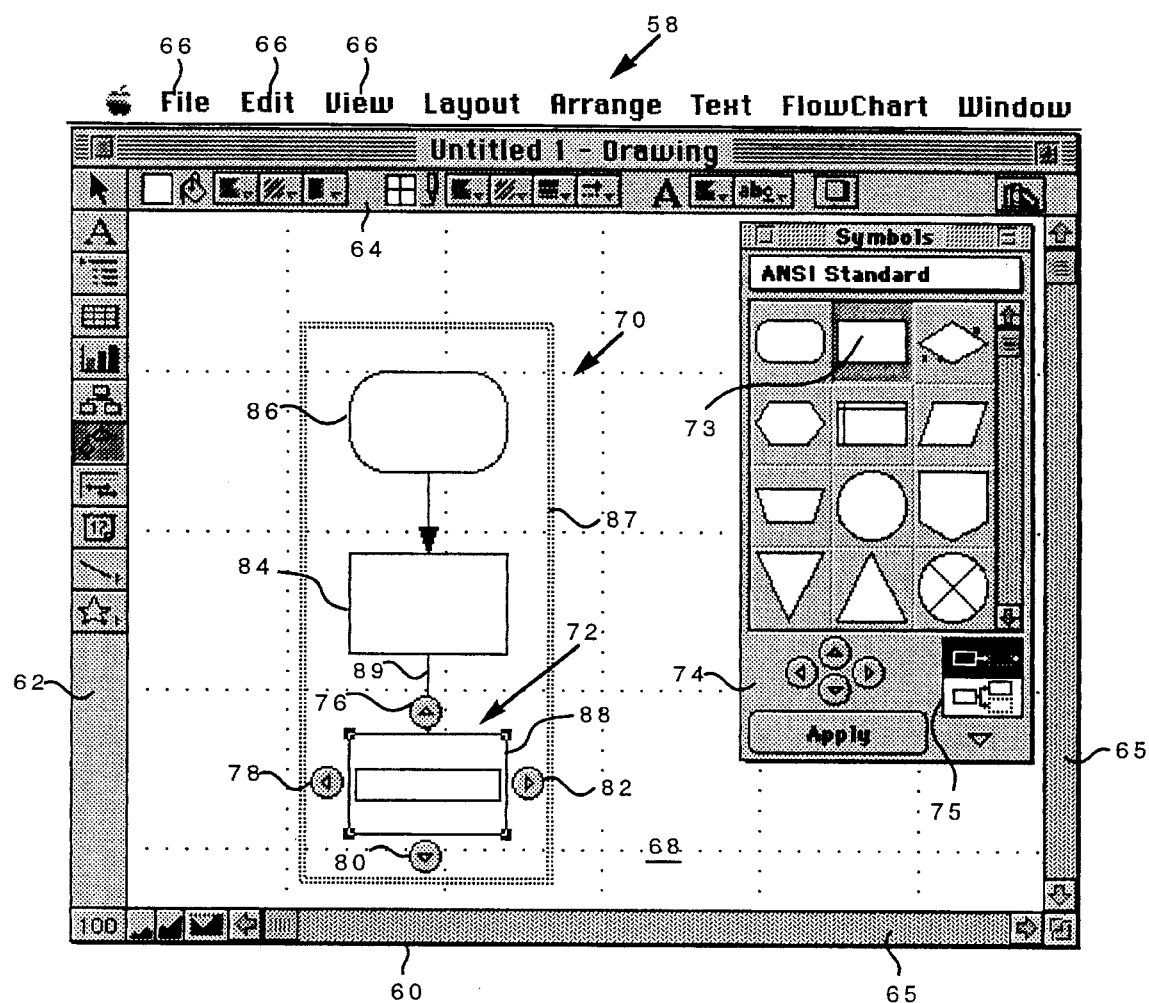

FIG. 6B shows a graphical representation of the screen 58 showing the resulting drawing produced by execution of the method of the present invention in response to selection of the bottom button 80 in FIG. 6A. The system 20 continues to display the plurality of pull down menus 66 and the window 60 with vertical tool bar 62, horizontal style bar 64, and scroll bars 65. However, the drawing portion 68 has been modified as follows. As shown in FIG. 6B, execution of the method of the present invention results in the creation of a new drawing element 88 and a new connector 89. In accordance with the present invention, the size of the active frame 87 is increased vertically downward to provide space for the new drawing element 88 and new connector 89. The new element 88 added is rectangular in shape with a size and spacing as specified in the default settings 48. The new element 88 is positioned below the selected element 84 in response to selection of the bottom button 80. The connector type is also serial as specified in the default settings 48, and couples the selected element 84 and the new element 88. As can also be seen from FIG. 6B, the first automatic generation user interface 72 is displayed about the new element 88. For additional automatic generation operations, the new element 88 is set to be the selected element.

Figure 6C:
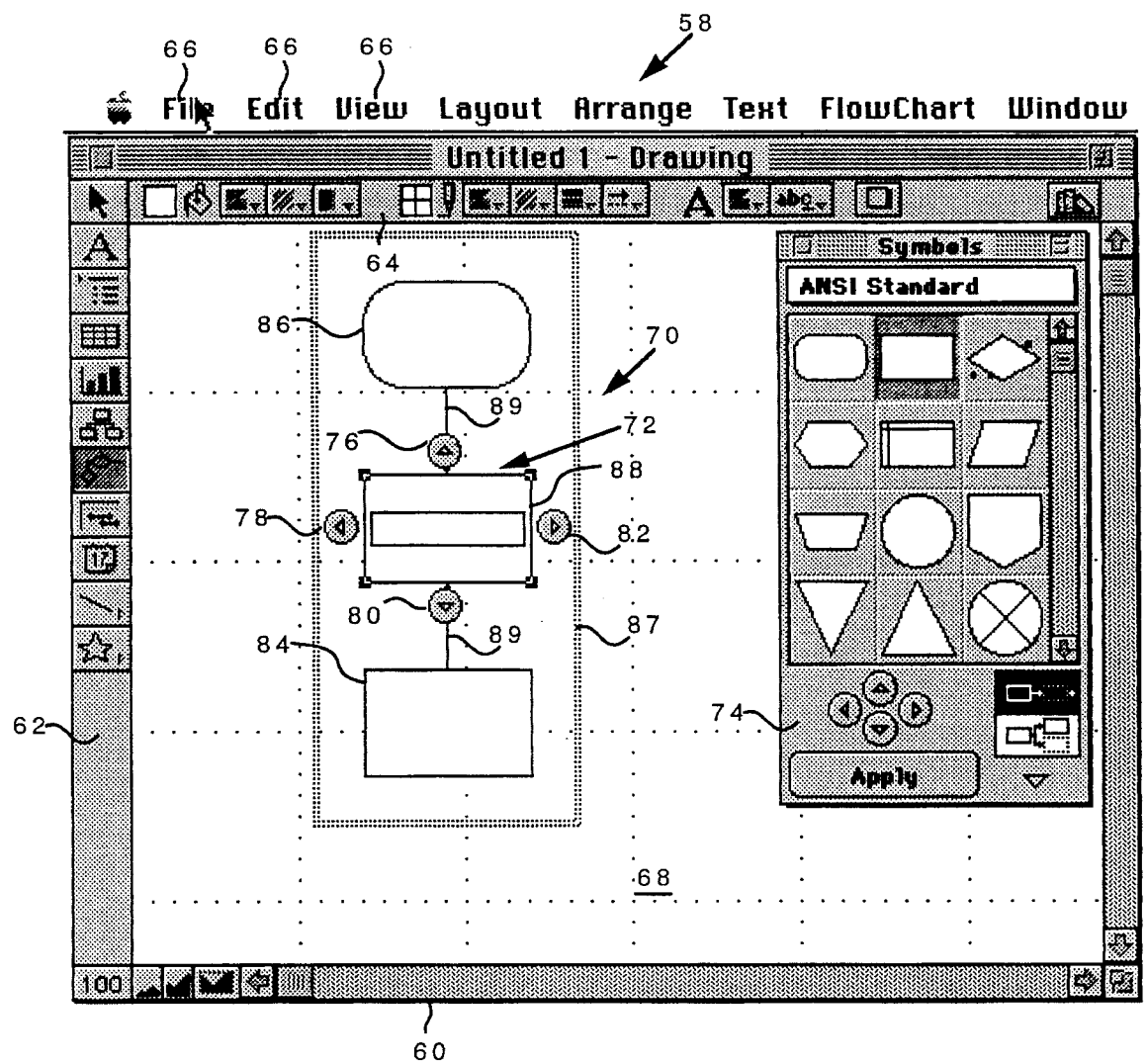

FIG. 6C shows a graphical representation of the screen 58 showing the resulting drawing produced by execution of the method of the present invention in response to selection of the top button 76 about the selected element 84 in FIG. 6A. Again, the system 20 continues to display the plurality of pull down menus 66 and the window 60 with vertical tool bar 62, horizontal style bar 64, and scroll bars 65. However, the drawing portion 68 has been modified to include the automatically generated new drawing element 88 and a pair of new connectors 89. The size of the active frame 87 is increased vertically upward to provide space for the new drawing element 88 and new connectors 89. The first element 84 is moved upward to provide space to position the new element 88. The new element 88 is rectangular in shape with a size and spacing as specified in the default settings 48.

The new element 88 is positioned beneath the first element 86 and above the selected element 84. The connector type is also serial as specified in the default settings 48. The previous connector between the selected element 84 and the first element 86 is deleted and new connectors 89 are added. One connector 89 connects the selected element 84 and the new element 88, and the other connector connects the new element 88 and the first element 86. The first automatic generation user interface 72 is displayed about the new element 88.

Figure 6D:
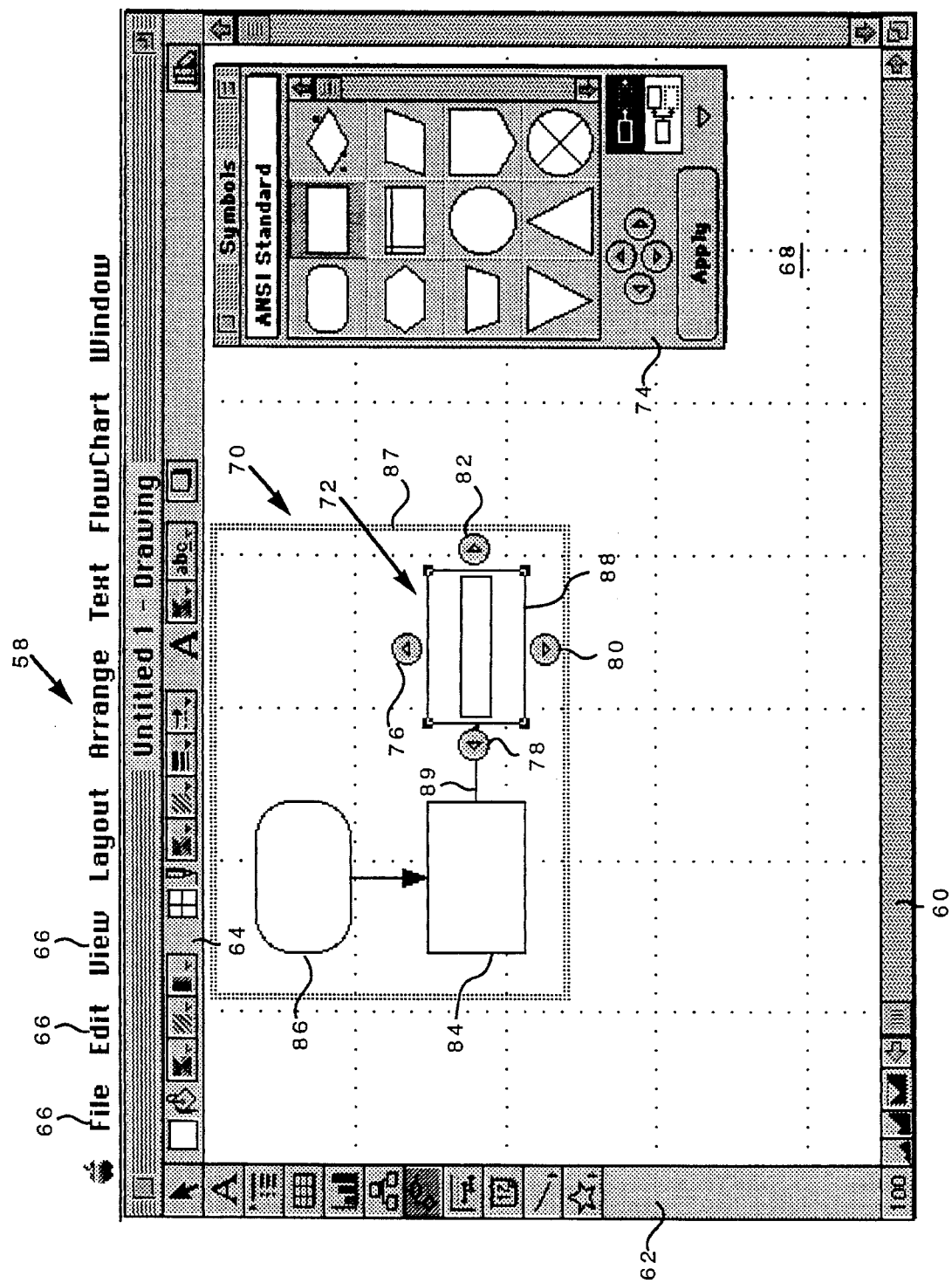

FIG. 6D shows a graphical representation of the screen 58 showing the resulting drawing produced by execution of the method of the present invention in response to selection of the right button 82 about the selected element 84 in FIG. 6A. The drawing portion 68 now includes the automatically generated new drawing element 88 and the new connector 89. The size of the active frame 87 has been increased horizontally to the right to provide space for the new drawing element 88 and new connector 89. The new drawing element 88 is positioned the predetermined default spacing to the right of the selected element 84. The connector is coupled between the selected element 84 and the new element 88. The first automatic generation user interface 72 is displayed about the new element 88.

Figure 6E:
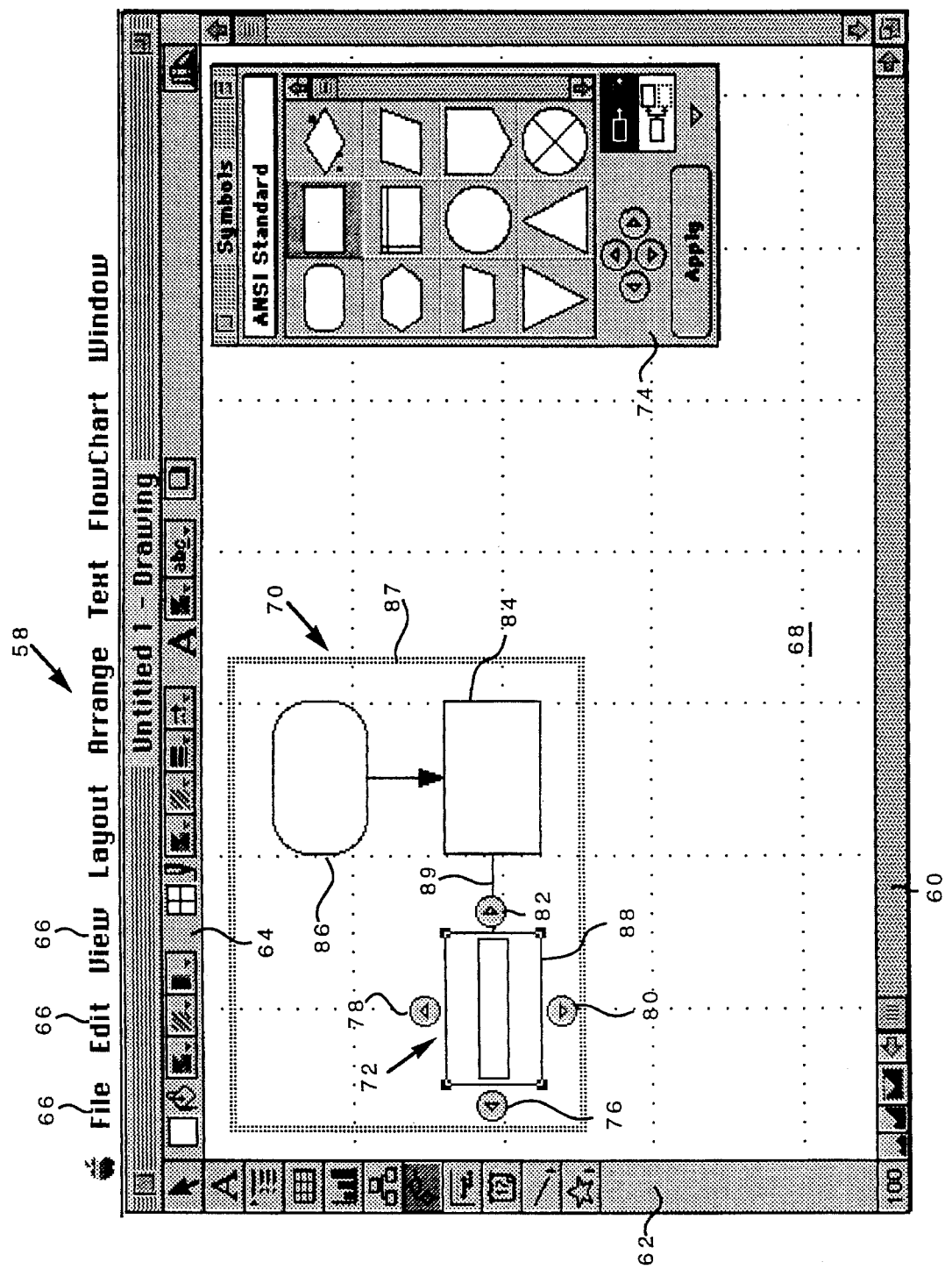

FIG. 6E shows a graphical representation of the screen 58 showing the resulting drawing produced by execution of the method of the present invention in response to selection of the left button 78 about the selected element 84 in FIG. 6A. The drawing portion 68 includes the added new drawing element 88 and the new connector 89. The size of the active frame 87 has been increased horizontally to the left to provide space for the new drawing element 88 and new connector 89. The new drawing element 88 is positioned the predetermined default spacing to the left of the selected element 84. The new connector 89 is coupled between the selected element 84 and the new element 88, and the first automatic generation user interface 72 is displayed about the new element 88.

Figure 7A:
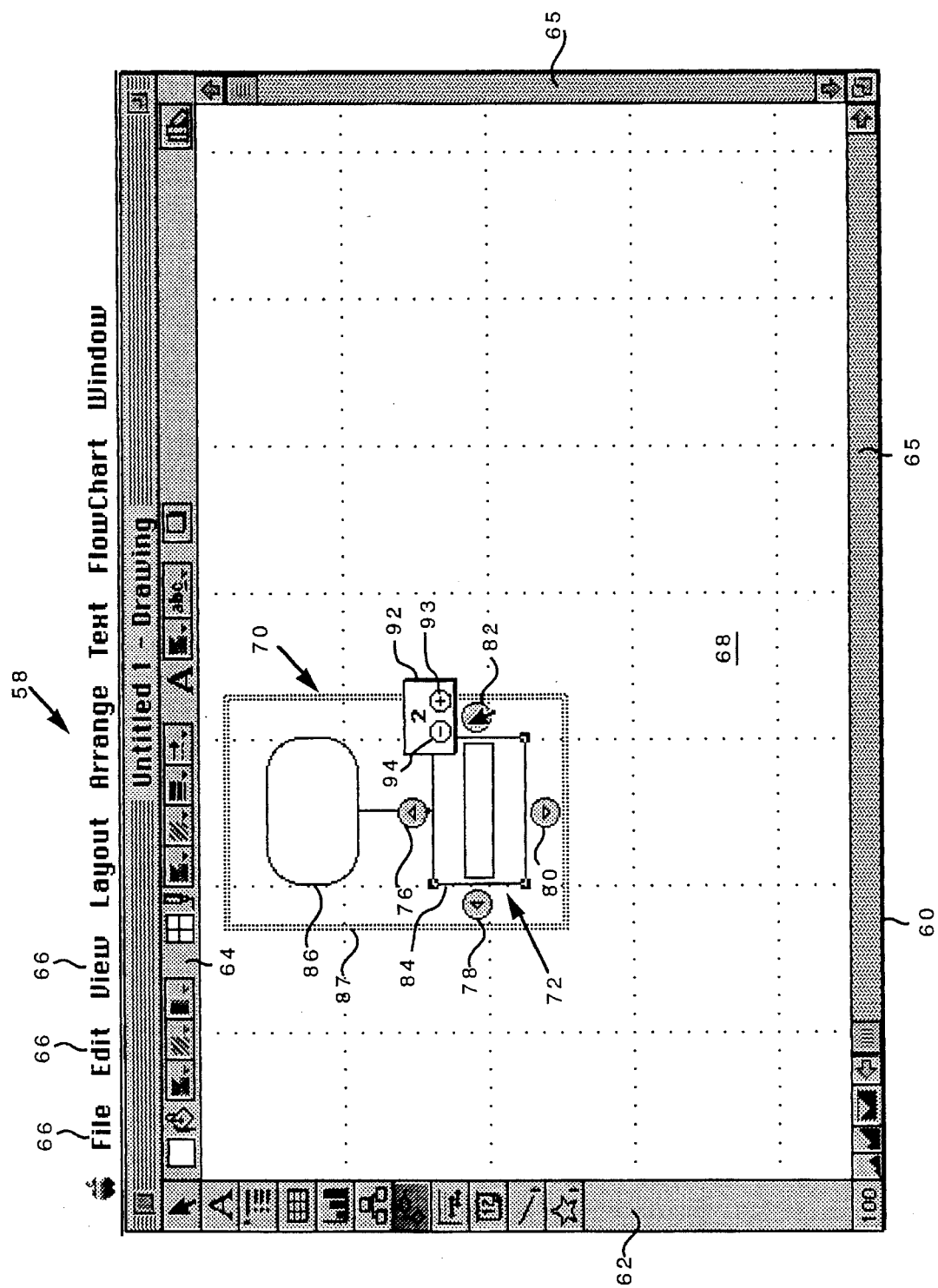
FIGS. 7A and 7B are a graphical representations of the display device showing a multiple generation user interface and the resulting flowchart produced by use of the multiple generation user interface.

The method for automatically generating flowchart elements described above with reference to FIGS. 3A–3C, has been described for the generation of only one new drawing element. However, the method of the present invention also provides for the automatic generation of multiple elements. The automatic generation of multiple elements and the method steps will now be described with reference to FIGS. 7A and 7B. FIG. 7A is similar to FIG. 6A and shows the window 60 presenting the two element 84, 86 flowchart 70. For ease of understanding like reference numerals have been used for like elements. In response to a multiple generation command, such as depressing the shift key simultaneous with a click button of the mouse while over one of directional control buttons 76, 78, 80 and 82, the system 20 generates and displays a multiple element generation interface 92 above the directional control buttons 76, 78, 80 and 82, as shown in FIG. 7A. The multiple element generation interface 92 displays the number of drawing elements that will be created as well as an increment button 93 and a decrement button 94. The multiple element generation interface 92 initially displays a "1" indicating that one drawing element will be produced. By positioning the cursor over either button 93, 94 and clicking the mouse button, the user can respectively increase or decrease the number of drawing elements that the system 20 will produced. The number displayed is adjusted by the system 20 according to user manipulation of the mouse over the buttons 93, 94. If the user decreases the number of elements to zero, the multiple element generation interface 92 is removed from the screen 58 and the multiple generation method is completed.

Figure 7B:
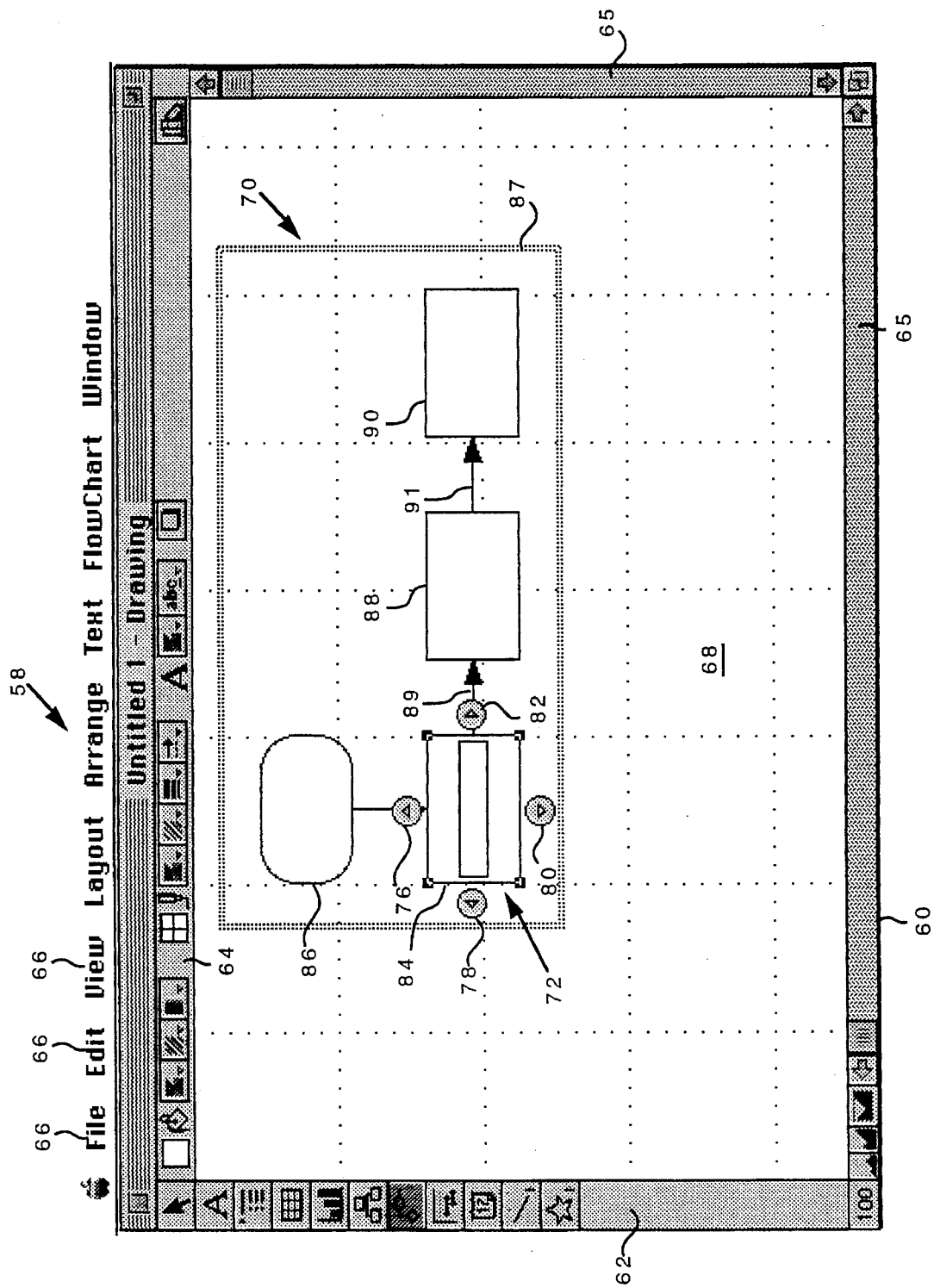

In an exemplary embodiment, the system 20 requires that the user depress the shift key continuously while incrementing or decrementing the number of drawing elements to be created. Once the shift key is released, the system 20 begins automatic generation of the number of elements that the user has specified with the multiple element generation interface 92. FIG. 7A shows the multiple element generation interface 92, after the user has increased the number of drawing elements to be created to two and before the user has released the shift key. Once the shift key is released, the system 20 generates the input number of drawing elements as has been described above with reference to FIGS. 3A–3C. The only differences for generation of multiple elements is the amount by which the active frame is increased, the number of drawing elements created, the spacing of the newly created drawing elements, and the number of new connectors. The distance the active frame is increased equals the number of drawing elements being created multiplied by the sum of the default size and the default spacing. The number of new drawing elements created is equal to the number specified by the user, and the number of connectors created is equal to the number of new elements if there are no elements connected in the selected direction or the number of new elements plus one if there are new elements connected in the selected direction. The elements are connected in serial or parallel spaced apart by the default distance. After the shift key is released in the state shown in FIG. 7A, the results produced by the system 20 are shown in FIG. 7B. The system 20 produces the two new drawing elements 88, 90. The new drawing element 88 and the second new drawing element 90 are positioned spaced apart by the default distance. The new drawing element 88 is also positioned the default distance from the selected element 84. The new drawing element 88 is joined to the selected element 84 by the new connector 89, and the new drawing element 88 is joined to the second new drawing element 90 by a second connector 91. Once the new drawing elements 88, 90 have been created, the first automatic generation user interface 72 is display about the selected element 84. While the multiple generation method of the present invention has been described above with reference to creation of a flowchart those skilled in the art will realize that is also applicable to the automatic generation of other types of element such as in organizational charts. Moreover, a variety of other keystroke and mouse manipulation may be substituted for the exemplary mouse click and shift key combination described above.

Figure 12A:
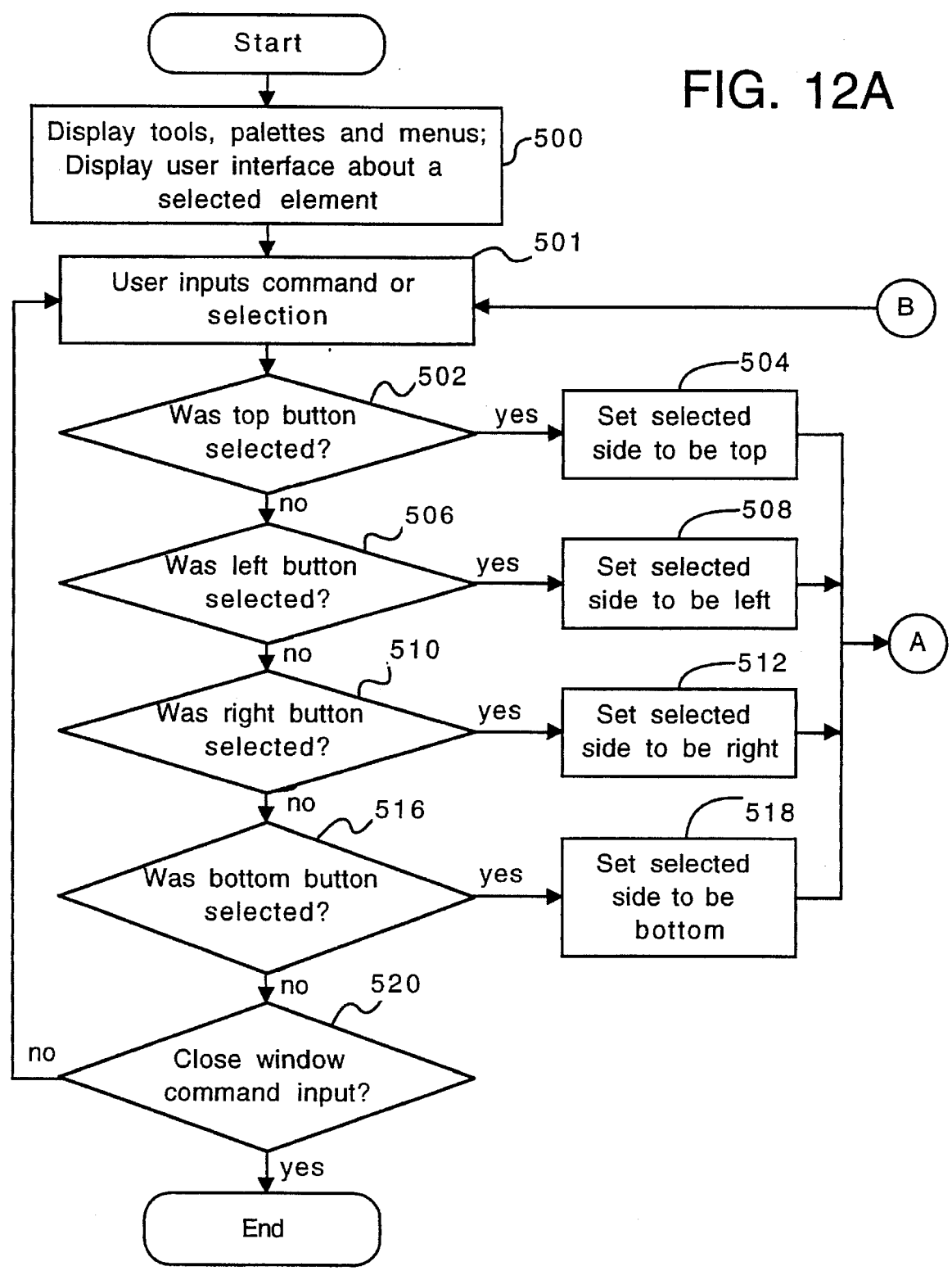
FIGS. 12A and 12B are a flowchart of a second method for generating a flowchart element at a selected position according to the present invention.
Figure 12B:
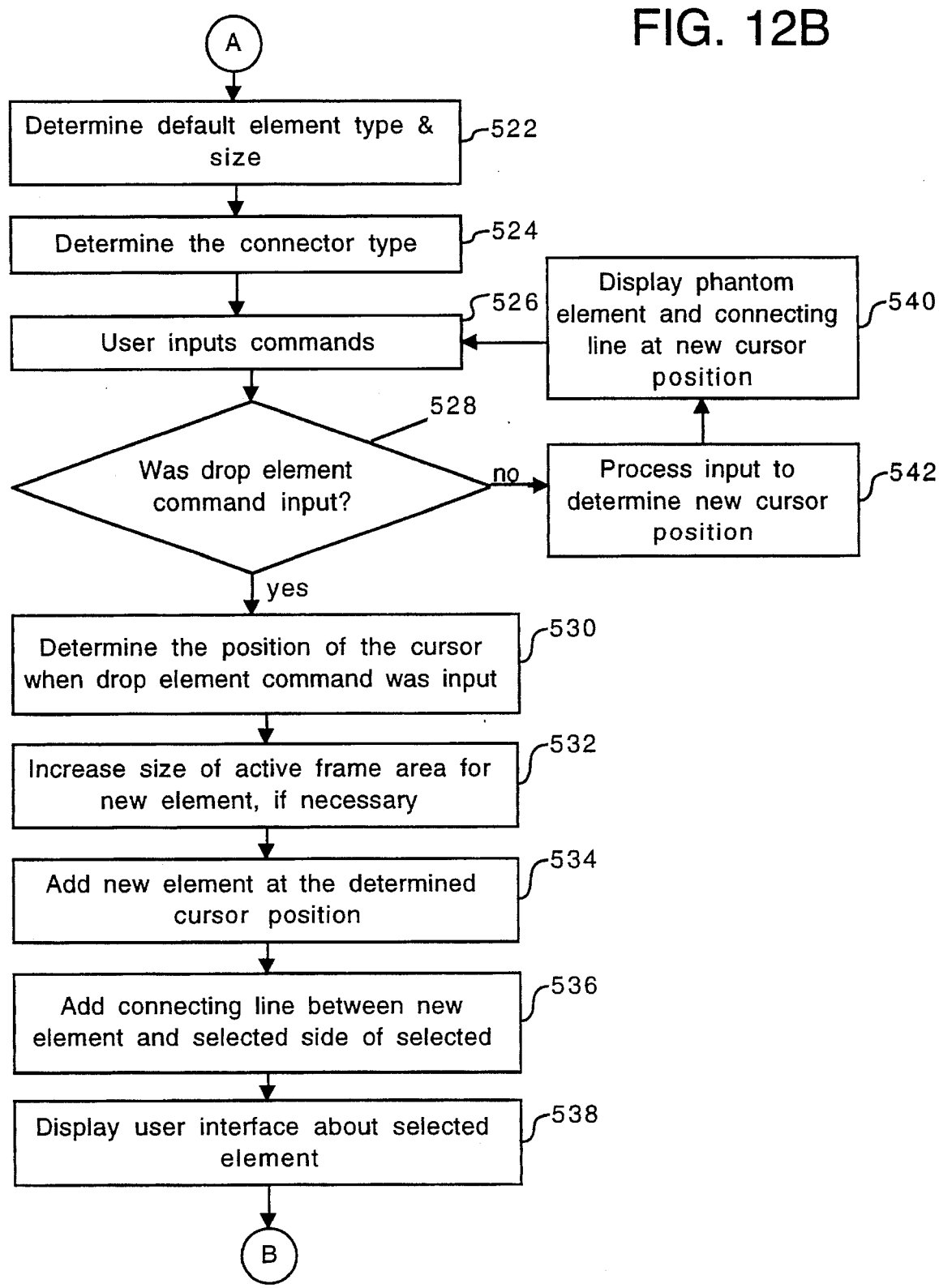

Referring now to FIGS. 12A and 12B, a flowchart of a second method for automatically generating an element of a flowchart at a selected position is shown. The method begins in step 500 with the tool bar, a style bar, scroll bars, menus, and a window being displayed. The first user interface 72 is also presented on the display device 22 about the selected object as has been described above. In step 501, the user inputs any one of a variety of commands or selections to create, edit or manipulate drawing elements. These commands may include conventional commands provided by drawing programs and are accessed in a conventional manner using keystrokes and/or mouse movements. Unless it is a command recognized by the second method, the command is disregarded by this method and processed by the CPU 28 under control of the charting and diagramming tools 42 in a conventional manner. The command recognized by the second method is the command for creating an object at a selected position. This command is input in the exemplary embodiment by depressing the mouse button while the cursor is positioned over one of the directional control buttons 76, 78, 80 and 82. While the mouse button remains depressed, the present invention advantageously updates the display as the cursor (or mouse) is moved to show a sample connection and a sample element with the same attributes as the element and connecting line that will be added. Once the mouse button is released, a new element and connecting line will be created and positioned at the cursor position when the mouse button was released.

Next in steps 502, 506, 510 and 516, the method tests whether the command is one that is processed by the second method. In step 502, the method determines whether the mouse button was depressed while the cursor was positioned over the top button 76. If so, the method proceeds to step 504 where the selected side is set to be top. Then the method continues in step 522 of FIG. 12B, as will be described below. If the mouse button was not depressed while positioned over the top button 76, then the method moves to step 506 to test whether the mouse button was depressed while the cursor was positioned over the left button 76. If so, the method proceeds to step 508 where the selected side is set to be left. After step 508, the method continues in step 522 of FIG. 12B. If the mouse button was not depressed while positioned over the left button 78, then the method moves to step 510. In step 510, the method determines whether the mouse button was depressed while the cursor was positioned over the right button 82. If so, the method proceeds to step 512 where the selected side is set to be right, and then the method continues in step 522 of FIG. 12B. If the mouse button was not depressed over the right button 82, then the method tests for a final directional control button by determining whether the mouse button was depressed over the bottom button 80 in step 516. If so, the method proceeds to step 518 where the selected side is set to be bottom, and then the method proceeds in step 522 of FIG. 12B. Determining the button selected by the user may occur in orders other than that described above. If the mouse button was not depressed over the bottom button 80, the method proceeds from step 516 to step 520 to determine if the close window command was input. If the close window command was not input, the method returns to step 510 to received and process additional user inputs. If the close window command was input, then the user has completed editing and manipulation of the drawing and the method is complete.

In step 522 of FIG. 12B, the method determines the default settings of the system 20 for the type of element to be added and the size of the element to be added. The CPU 28 under control of the routines of the present invention reads this data from the default settings memory 48. Similarly to the method of FIG. 3, the default type for the element is shown in the symbol palette 74 and may be changed by the user. Next in step 524, the method determines the default connector type by reading the default settings from memory 30.

Figure 11:
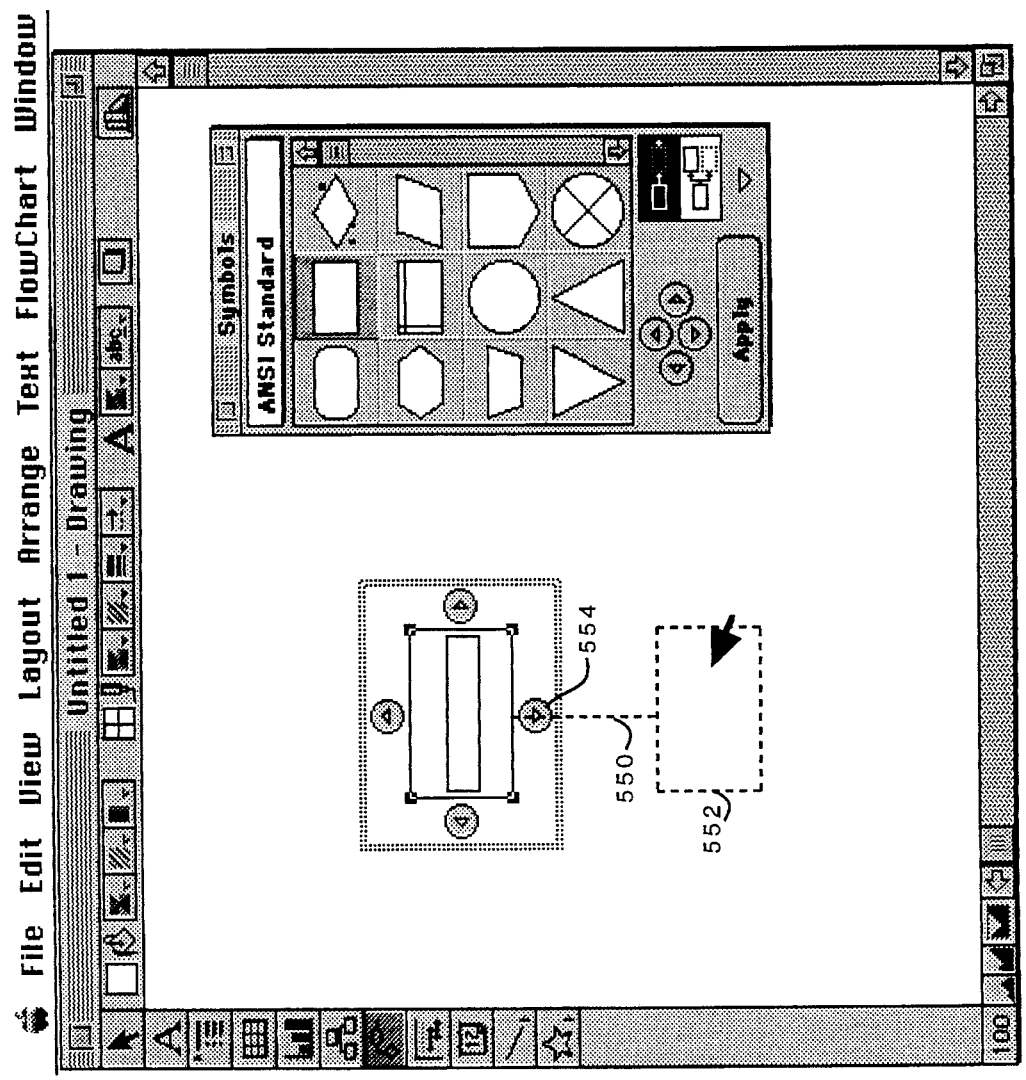
FIG. 11 is a graphical representation of the display device showing the user interface for a drawing generation and manipulation tool, and a new element to be added shown in phantom in accordance with a second method for generating flowchart elements.

In step 526, the user inputs any one of a variety of commands or selections to create, edit or manipulate drawing elements. In step 528, the method tests whether the command input is the drop or place element command. In the preferred embodiment, the drop element command is input by a release of the mouse button. If the drop element command was not input (e.g., the mouse button has not been released), then the method processes the input in step 542. In step 542, the second method ignores the input command in step 526 unless it is a command to move the cursor (e.g., movement of the mouse). In step 542, the method processes the input by determining the new cursor position if the command was to move the cursor. If the command does not affect cursor position, no action is taken and the command is not accepted as input by the drawing tools 42. Then in step 540, the method updates the display by showing a phantom drawing element and connecting line as they will be added to the drawing if the drop element command were input. As shown in FIG. 11, the phantom drawing element 552 and connecting line 550 are shown connected to the selected side, the side corresponding to the button 554 over which the cursor was positioned and the mouse button depressed. The phantom drawing element 552 and connecting line 550 are preferably shown with dashes, however, other types of highlighting could be used. The present method also advantageously sizes the phantom drawing element 552 with the same size and positions the phantom connecting line 550 with the same position as the determined element size and connector type from steps 522 and 524, respectively. It should be understood that the steps 526, 528, 542 and 540 may be repeated a number of times to repeatedly update the display as the mouse or input device 24 is moved, thereby providing the user with visual feedback that appears as if the phantom drawing element 552 and connecting line 550 are being dragged to parallel the movement of the mouse until the mouse button is released. This is particularly advantageous because the user is alerted to the precise position where the new element and connector will appear.

If the drop element command is determined in step 528 to have been input, the method performs step 530. In step 530, the method determines the position of the cursor when the mouse button was released. This position specifies where the new drawing element will be positioned. Next in step 532, the method determines whether the default element can be added within the active frame, and the size of the active frame is increased if necessary. Using the default values for the spacing and size of the new element, the system 20 increases the active frame by an amount necessary to place the new element at the determined position for the cursor. Then in step 534, a new element is generated using the routines provided by the charting and diagramming tools 42. A new element record 44 corresponding to the new element is generated and stored in memory 44. The new element has a default type and size as was determined in step 522. In step 536, a connecting line is added between the selected element and the new element. Finally, in step 538, the first automatic generation interface 72 is displayed about the selected element. Since an element has now been automatically generated and inserted by the system 20 of the present invention, the method returns to step 501 to receive additional commands via the input device 24.

Figure 8A:
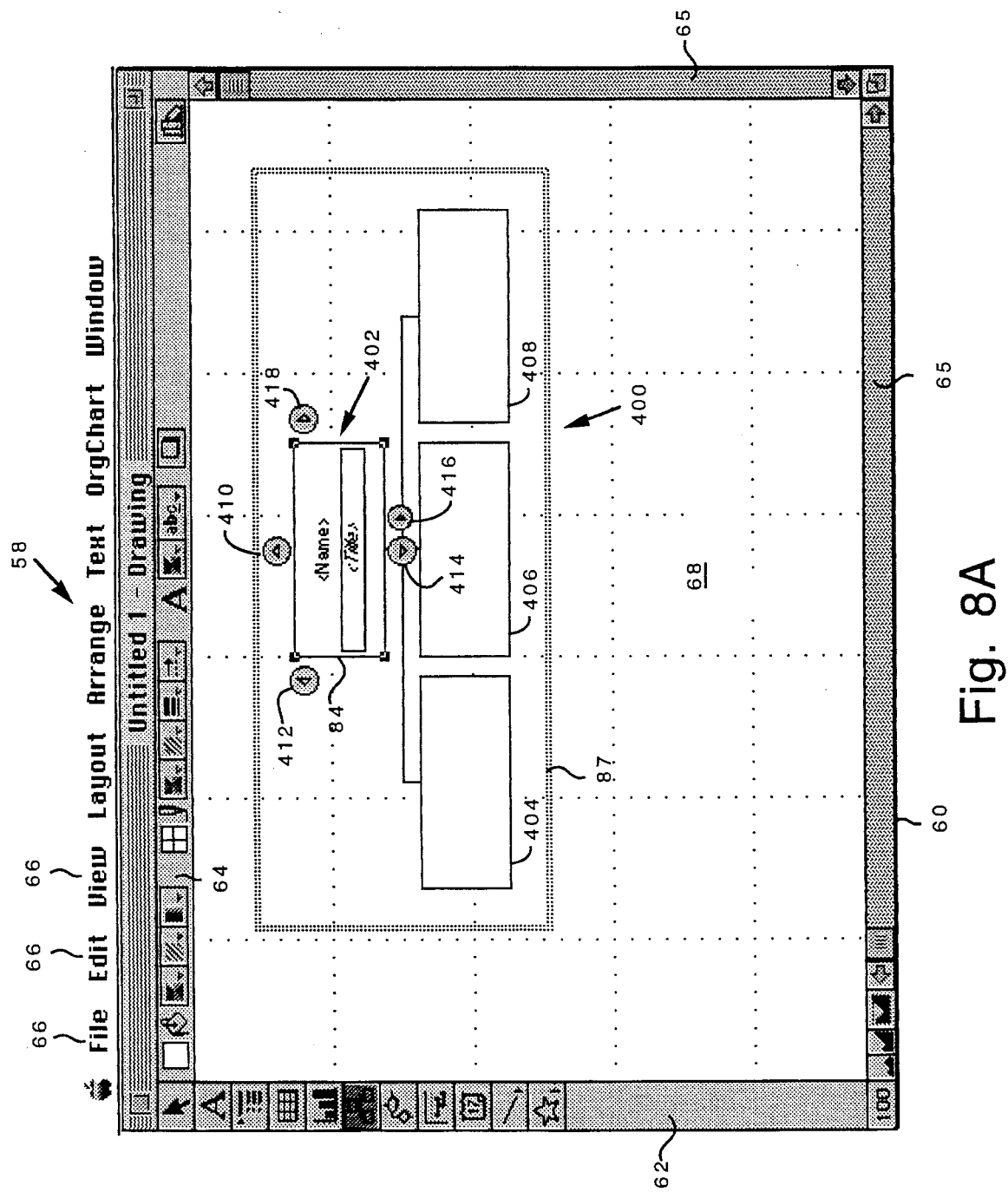
FIG. 8A is a graphical representation of the display device showing a second automatic generation user interface for organizational charts.

Referring now to FIGS. 4A–4D, a preferred method for automatically generating elements of an organizational chart will be described. The method begins in step 200 by displaying the tool bar 62, style bar 64, scroll bars 65, menus 66 and empty window 60 with a drawing portion 68 on the screen 57 of the display device 22. Next in step 202, the user selects an organizational chart as the chart type using the input device 24. Then in step 204, a chart having the style selected is created on the drawing portion 68 of the window 60. An exemplary default organizational chart preferably has a single first level element and three elements on the next level as shown in FIG. 8A. In step 206, a chart element is set to be the selected element according to a default setting. The default element is selected to be the first level element. Steps 202–206 are similar to steps 100–106 and may be performed as has been described above except that an organizational chart is involved.

Next in step 208, the method determines whether the selected element is at the first level of the organizational chart being edited or created. If the selected element is at the first level, the method displays the second automatic generation interface 402 about the selected element 84 in the flowchart 400, and the method continues in step 218. If the selected element is not at the first level, the method determines in step 212 whether the selected element is assistant type element. If the selected element is an assistant type element, the method displays a fourth automatic generation interface 404 about the selected element 84 in step 214, and the method continues in step 218. On the other hand, if the selected element is not an assistant type element, the method displays a third automatic generation interface 422 about the selected element 84 in step 216, before the method continues in step 218.

The user inputs any one of a variety of commands or selections to create, edit or manipulate drawing elements. These selections and commands are input and received by the system 20 in step 218. Similar to step 110 of FIG. 3A, these commands may include conventional commands provided by drawing programs and are accessed in a conventional manner using keystrokes and/or mouse movements. The conventional commands are processed by the CPU 28 under control of the charting and diagramming tools 42 in a conventional manner. Additionally, the present invention also has the ability to process automatic generation commands specified by the selection of one of the directional control buttons 410, 412, 414, 416, 418, 424 and 426 for organizational chart type diagrams.

Figure 4A:
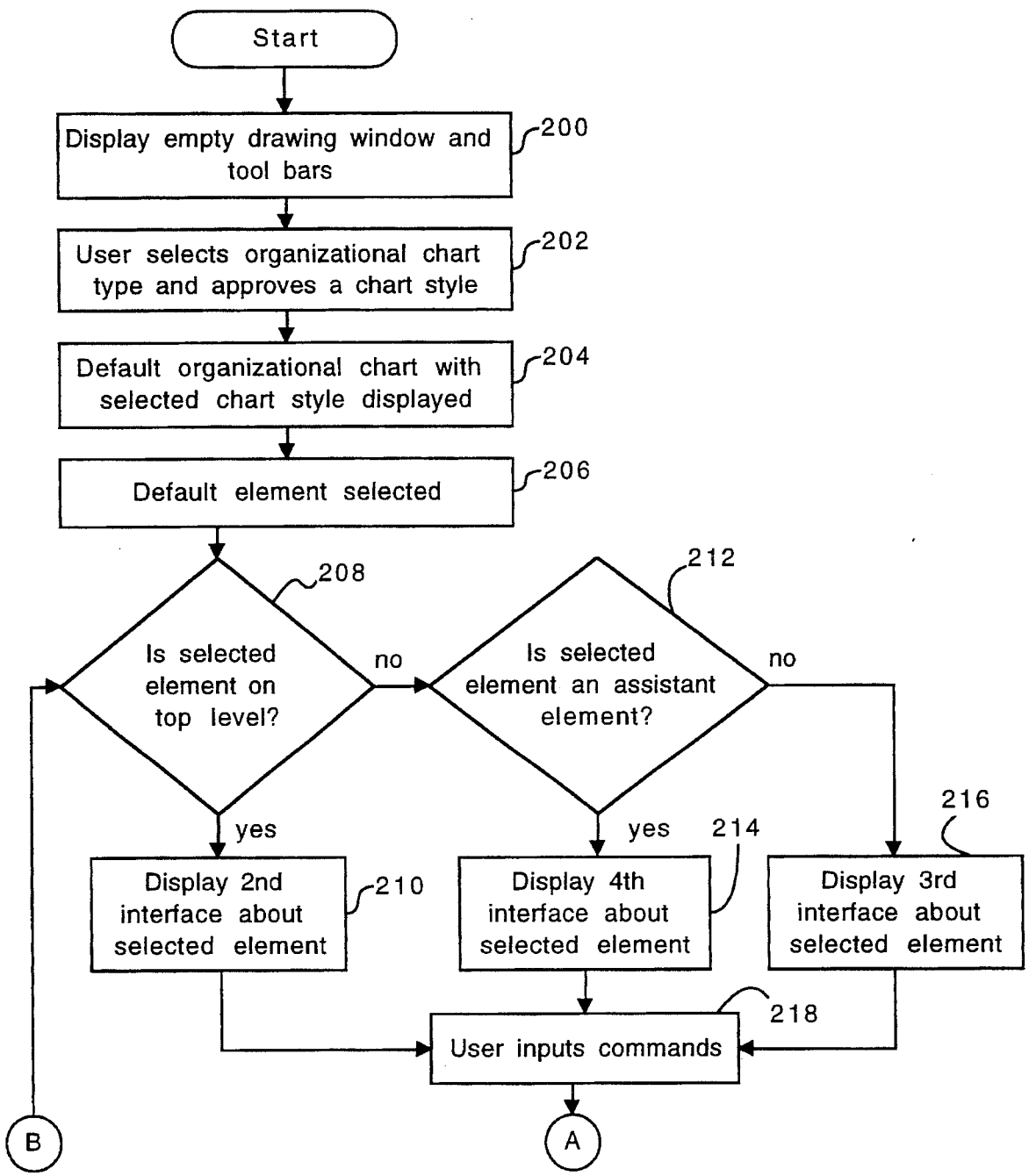
FIGS. 4A, 4B, 4C and 4D are a flowchart of the preferred method for automatically generating an organizational chart element according to the present invention.
Figure 4B:
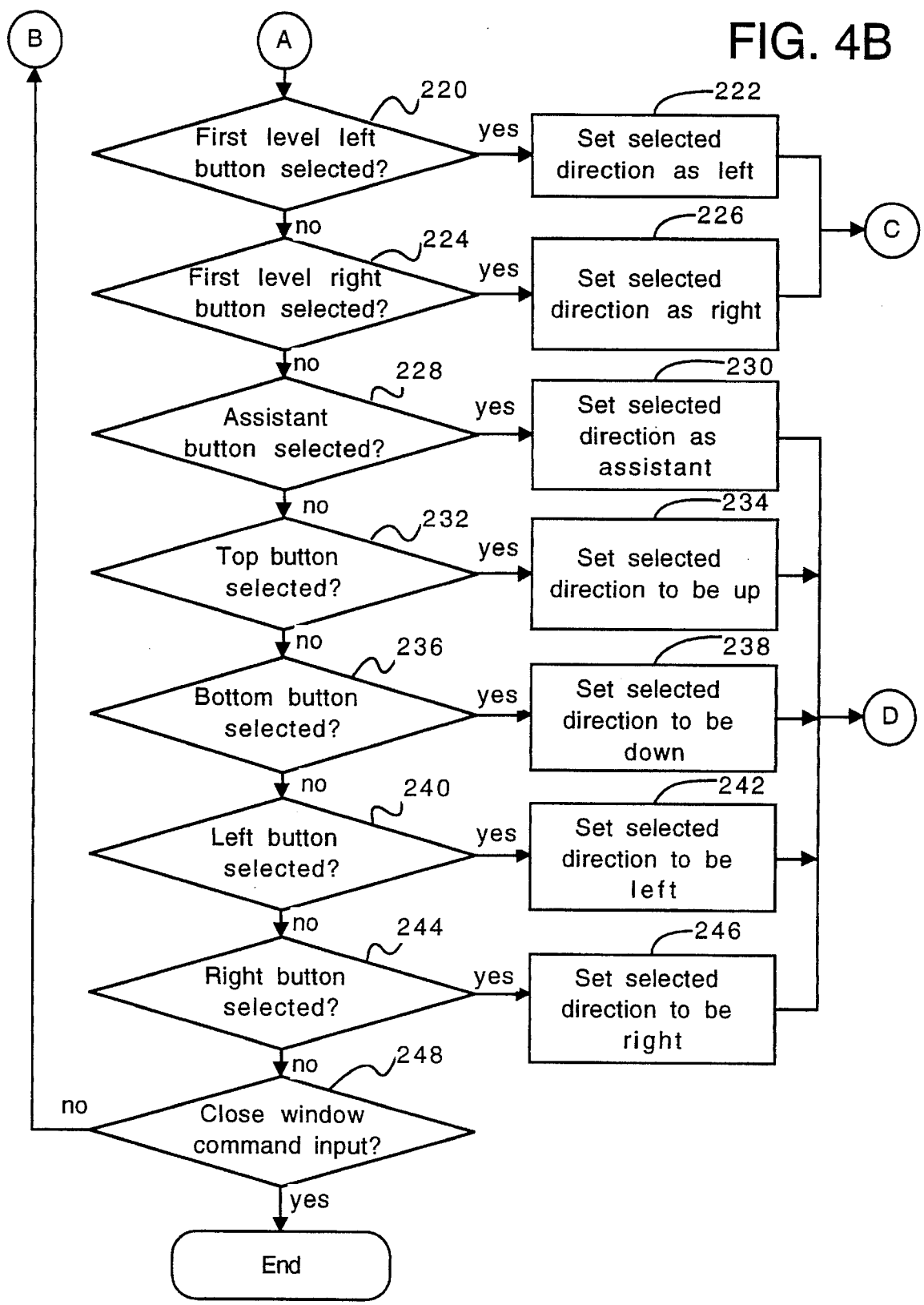
Figure 4C:
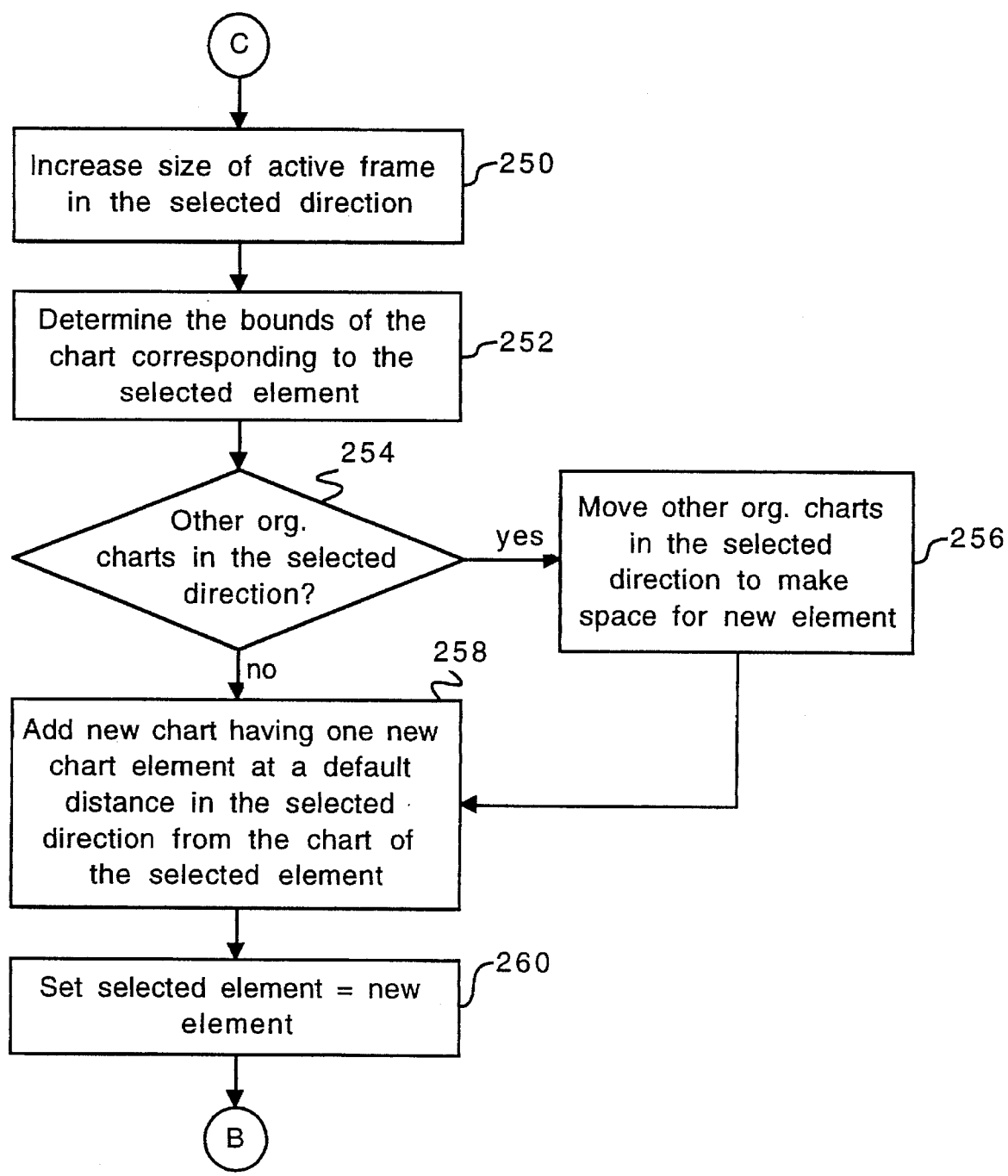

As shown in FIG. 4B, the preferred method tests whether any of the directional control buttons 410, 412, 414, 416, 418, 424 and 426 for organizational chart type diagrams has been selected in step 218. In particular, in step 220, the method determines whether the first level (level 1) left button 412 was selected. If the first level left button 412 was selected by the user, the method proceeds to step 220 where the selected direction is set to left. Then the method continues in step 250 of FIG. 4C. If the first level left button 412 was determined not to be selected by the user in step 222, then the method moves to step 224 to test whether the first level right button 418 was selected. If the first level right button 418 was selected by the user, the method proceeds to step 226 where the selected direction is set to right. After step 226, the method continues in step 250 of FIG. 3C. If the first level right button 418 was not selected by the user, then the method moves to step 228. In step 228, the method determines whether the assistant button 416 was selected. If the assistant button 416 was selected, the selected direction is set to assistant in step 230, and then the method continues to step 262 of FIG. 4D. If the assistant button 416 was not selected by the user in step 228, the method proceeds to step 232. In step 232, the method determines whether the top button 410 was selected. If the top button 410 was selected, the method proceeds to step 234 where the selected direction is set to be up. Then the method continues in step 262 of FIG. 4D. If top button 410 was not selected, then the method moves to step 236 to test whether the bottom button 414 was selected. If the bottom button 414 was selected by the user, the method proceeds to step 238 where the selected direction is set as down. After step 238, the method continues in step 262 of FIG. 4D. If the bottom button 414 was not selected, the method proceeds to step 240 where the method determines if the left button 424 was selected. If the left button 424 was selected, the method proceeds sets the selected direction as left in step 242. Then the method continues in step 262 of FIG. 4D. If the left button 424 was not selected, then the method moves to step 244 to test whether the right button 426 was selected. If the right button 426 was selected by the user, the method proceeds to step 246 where the selected direction is set to be right. While the determination of the button 410, 412, 414, 416, 418, 424 and 426 selected by the user has been described above as occurring in a predetermined order, those skilled in the art will realize that the testing steps of 220, 224, 228, 232, 236, 240 and 244 and the corresponding setting of the selected direction could be performed in other orderings. If the right button 226 was not selected, the method proceeds from step 244 to step 248 to determine if the close window command was input. If the close window command was not input, the method returns to step 208 to display the appropriate user interface 402, 422, 430 and received and process additional user inputs. If the close window command was input, then the user has completed editing and manipulation of the drawing and the method is complete.

The automatic generation for organizational charts provides a plurality of interfaces 402, 422 and 430. Each interface 402, 422 and 430 provides different types of automatic generation controls depending on the level in the chart for the selected element. Each of the automatic generation interfaces 402, 422 and 430 is adjusted by including the control buttons 410, 412, 414, 416, 418, 424 and 426 appropriate for the level of the selected element in the organizational chart. This greatly simplifies the use of the control buttons 410, 412, 414, 416, 418, 424 and 426 for the user. More specifically, the system 20 generates a single element organizational chart in response to selection of the first level left button 412 and first level right button 418. These buttons 412, 418 are shown in a visually distinct manner from the normal left and right buttons 424, 426 for organizational charts. This automatic generation process for these buttons 412, 418 is detailed in steps 250–260 of FIG. 4C. In step 250 of FIG. 4C, the method increases the size of the active frame 87 area to provide space to accommodate a second organizational chart 432 (See FIG. 8E). The active frame 87 is increased in the selected direction. The active frame 87 is increased by the default size of a new organizational chart element and the default spacing between charts. The CPU 28 under control of the routines of the present invention reads this data from the default settings memory 48. Next, in step 252, the bounds of the chart of the selected element is determined. The bounds of the chart for the selected element can be determined by establishing or reading the locations and extents of all the elements forming the chart of the selected element. Then in step 254, the method tests whether there are any other charts in the selected direction from the chart of the selected element. If there are other charts in the selected direction, the method moves the existing charts in the selected direction a predetermined distance to make space for the new chart in step 256. After step 256, the method continues in step 258. If there are no other charts in the selected direction, the method proceeds directly to step 258. In step 258, the method creates a new chart with a single element. The chart type and element type created are those specified by the default settings 48. The new chart with a new, single element is then positioned the default distance in the selected direction from the chart of the selected element. Next in step 260, the method sets the selected element to be the new element of the new chart. Then the method returns to step 208 to display the appropriate user interface 402, 422, 430 about the new element. The results of selection of a first level button 412, 418 can be seen form FIGS. 8A and 8E.

Figure 4D:
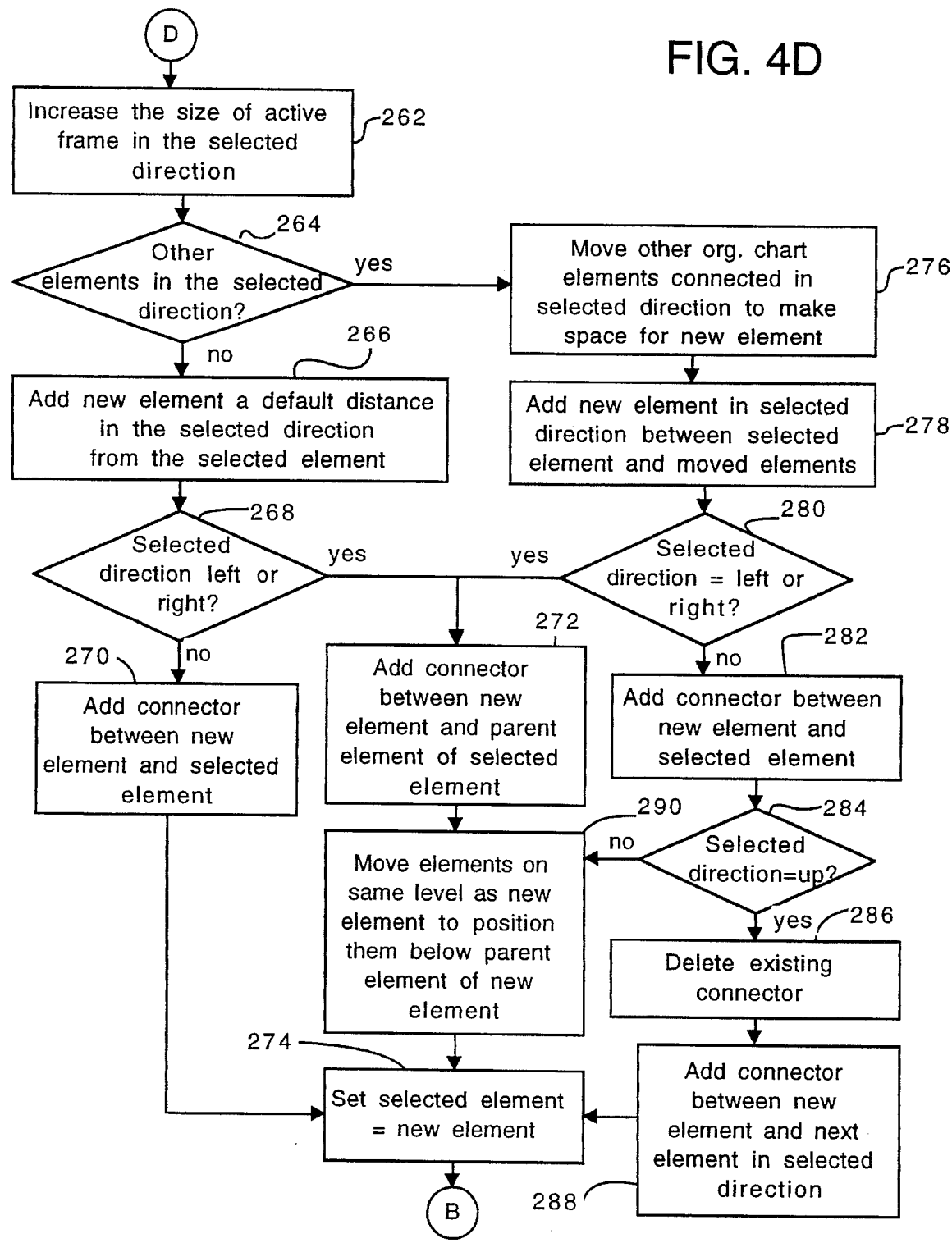

This automatic generation process for the remaining control buttons 410, 414, 416, 424 and 426 is detailed with reference to FIG. 4D. In step 262, the preferred method increases the size of the active frame 87. Then in step 264, the method determines whether there are any other drawing elements in the selected direction. If there are not any other drawing elements in the selected direction, the method executes step 266. In step 266, the method creates a new chart element and corresponding element record 44. The chart element type created is that specified by the default settings 48. The new chart element is then positioned the default distance in the selected direction from the selected element. If an assistant type element is being created then the position is below and slightly to the left of the selected element. The appropriate data specifying the size, position and style of the new element are stored in the corresponding element record 44. Next in step 268, the method tests whether the selected direction in left or right. If the selected direction is not left or right, the method branches to step 270. In step 270, the method adds a connector element between the selected element and the new chart element. A corresponding connector record 46 is generated and stored in the memory means 30. If the selected direction is left or right in step 268, method proceeds to step 272 where a new connector is added between the new element added and the parent element of the selected element in the organizational chart. Then in step 290, the method moves the drawing elements on the same level as the new element including the new element to properly position them below the parent element to the new element. The relative horizontal positioning between the elements is maintained when the elements are moved. If the selected direction is left, right or down, the elements on the same level of the organizational chart as the new element will be centered below the parent element of the new element. If the selected direction is set to assistant and the number of drawing elements on the same level of the organizational chart as the new element is an even number, the method moves these elements to center them below the parent element of the new element. If the selected direction is set to assistant and the number of drawing elements on the same level of the organizational chart as the new element is an odd number, the method moves these elements to position them slightly right of a center point below the parent element of the new element. After either step 270 or step 290, the method in step 274 sets the selected element to be the new chart element, and the method returns to step 208 to display the appropriate user interface 402, 422, 430 about the new element.

If in step 264 it is determined that there are other drawing elements in the selected direction, the method proceeds to step 276. In step 276, the method moves the existing chart elements that are positioned in the selected direction a predetermined distance to provide space to position the new element that is being automatically generated, and the corresponding element records 44 are updated. The distance the existing elements are moved vertically and horizontally depends in part on the setting for the selected direction. If the selected direction is left, right or up, the existing elements are moved in the selected direction by an distance about equal to the default size of the new element in the selected direction plus double the default spacing required in the selected direction. If the selected direction is down, then the existing elements are moved to the left a predetermined distance. The predetermined distance is about the horizontal default distance for the new element plus the horizontal default spacing between elements. If assistant is the selected direction, the existing elements are move alternatively down if there are no other existing assistant type elements or to the left if there are other assistant type elements. Next in step 278, the method generates a new drawing element and positions the new drawing in the space created by movement of the existing elements in step 276. When the selected direction is left, right or up, the new element is positioned between the selected element and the moved elements. For down as the selected direction, the new element is positioned to the right of the right most element in the next level of elements below the selected element. The next level of elements is the next level of elements other than assistant type elements. When assistant is the selected direction, the method positions the new element right of the center of the selected element and between the next level of elements if the next level of elements are not of the assistant type. Otherwise, the method positions the new element to the right of the right most element in the next level of elements below the selected element, if the next level of elements are of assistant type. Then in step 280, the method tests whether selected direction is left or right. If the selected direction is left or right, then method proceeds to step 272 and continues as has been described above. However, if selected direction is not left or right, the method continues in step 282. In step 282, the method generates a new connector between the selected element and the new element. Then in step 284, the method tests whether the selected direction is up. If the selected direction is not up the method proceeds to step 290 and continues as has been described above. However, if the selected direction is up, the method continues in step 286. In step 286, the method determines the next element(s) that are directly connected to the selected element in the selected direction. A list of the next element(s) is preferably temporarily stored in the memory means 30. Then the existing connector(s) between the selected element and the next element(s) are deleted. Then in step 288, the method generates one or more connectors between the new element and the next element(s) previously directly connected to the selected element as determined in step 286. After step 288, the method proceeds to step 274 and its successive steps to display the appropriate user interface 402, 422, 430 about the new element.

Referring now to FIGS. 8A–8E, the operation of the preferred method for creating elements of an organizational chart using the second automatic generation user interface 402 is described. FIGS. 8A–8E are a graphical representations of the screen 58 of the display device 22 showing the window 60, vertical tool bar 62, horizontal style bar 64, scroll bars 65, the drawing portion 68, the active frame 87 and an exemplary organizational chart 400. The differences between FIG. 8A and FIGS. 8B–8E illustrate the results of selection of the directional control buttons 410, 412, 414, 416 and 418 and operation of the present invention. For ease of understanding like reference numerals used for FIGS. 6A–6E have been used for like elements in FIGS. 8A–8E. FIG. 8A illustrates the exemplary organizational chart 400 that comprises the selected element 84, a first existing element 404, a second existing element 406 and a third existing element 408. The second automatic generation user interface 402 is displayed about the selected element 84, and the interface 402 comprises the top button 410, the first level left button 412, the bottom button 414, the assistant button 416 and the first level right button 418.

Figure 8B:
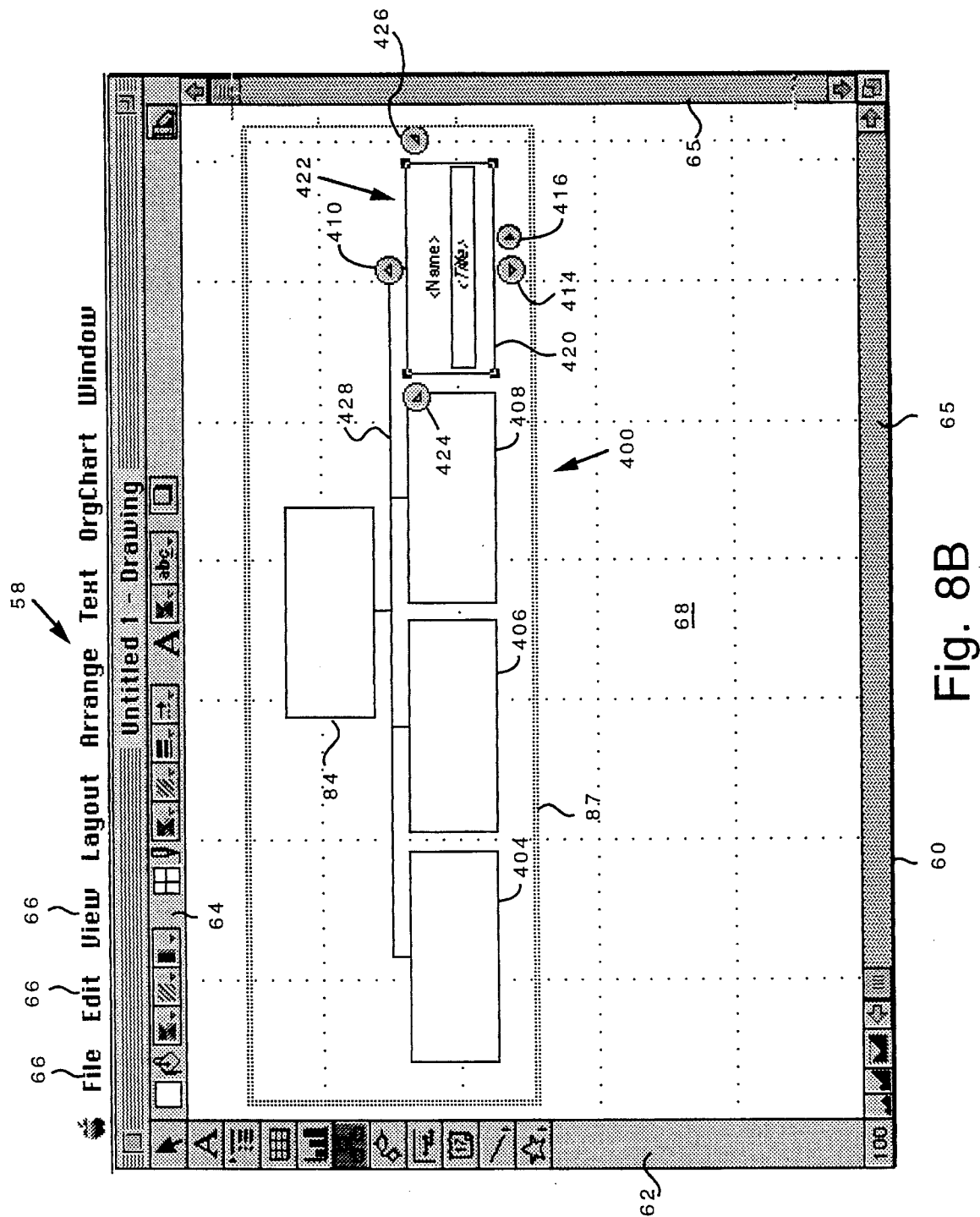
FIGS. 8B, 8C, 8D and 8E are a graphical representations of the display device showing resulting organizational charts produced by use of the second automatic generation user interface.

FIG. 8B is a graphical representation of the automatic generation results of selecting the bottom button 414 of the second user interface 402 of FIG. 8A. The existing elements 404, 406, and 408 in the selected direction (down) are moved to the left to provide space to position the new element 420 to the right of the right most element 408. A new connector 428 is added connected between the new element 420 and the selected element 84. Then the elements 404, 406, 408, and 420 on the same level as the new element 420 are centered below the parent element 84 of the new element 420 as shown in FIG. 8B. The method then executes steps 274, 208, 212 and 216 to determine that the third automatic generation interface 422 is displayed about the new element 420.

Figure 8C:
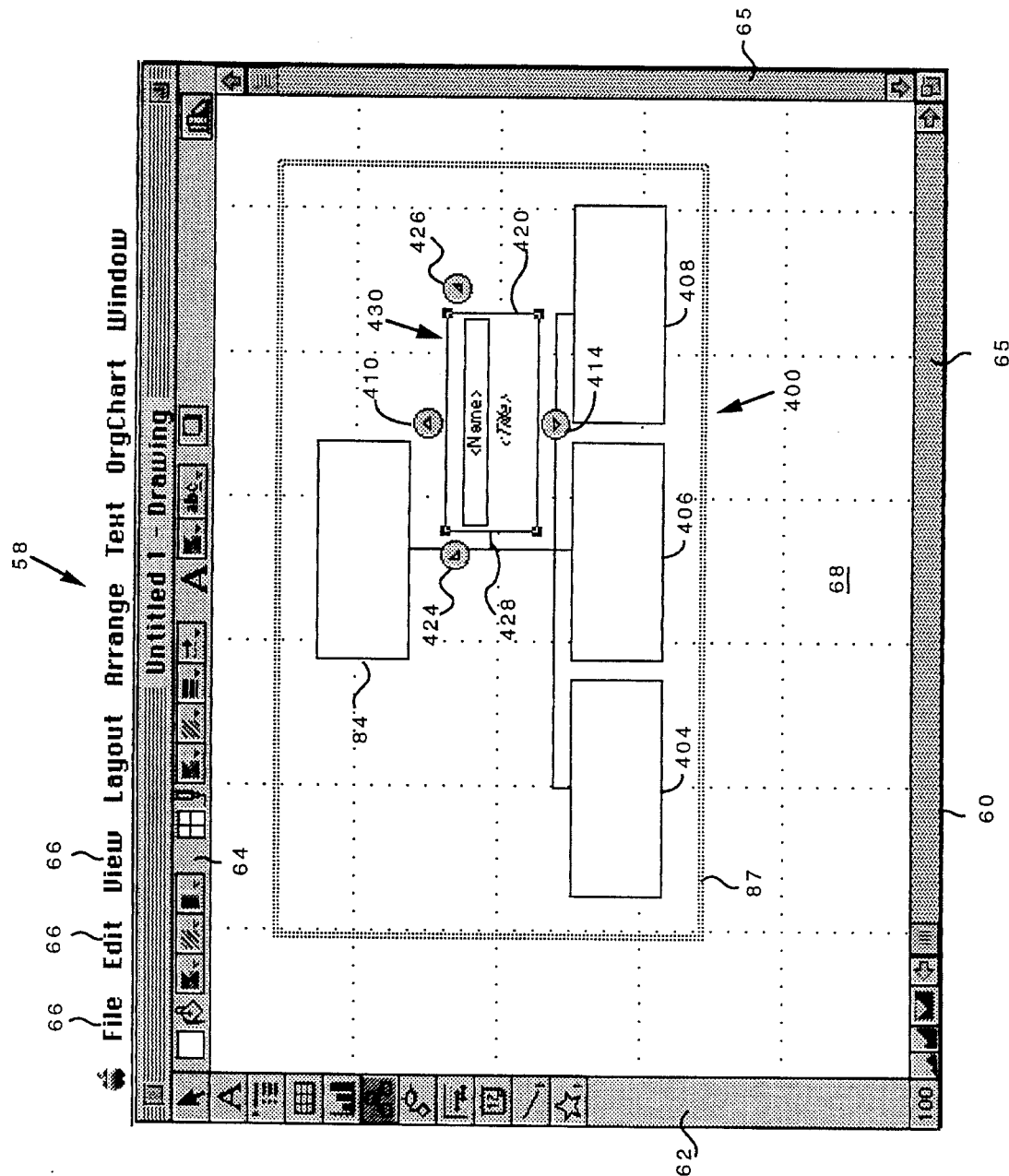

FIG. 8C is a graphical representation of the automatic generation results of selecting the assistant button 416 of the second user interface 402 of FIG. 8A. The existing elements 404, 406 and 408 in the selected direction are moved down to provide space to position the new assistant element 420 between the selected element 84 and the existing elements 404, 406 and 408. The new assistant element 420 is positioned below and to the left of the center of the selected element 84 as shown in FIG. 8C. A new connector 428 is added connected between the new element 420 and the selected element 84. None of the elements are moved when step 290 is executed since there are no other elements with the same level as the new element 420. The method then executes steps 274, 208, 212 and 216 to determine that the fourth automatic generation interface 430 is displayed about the new element 420 as shown in FIG. 8C.

Figure 8D:
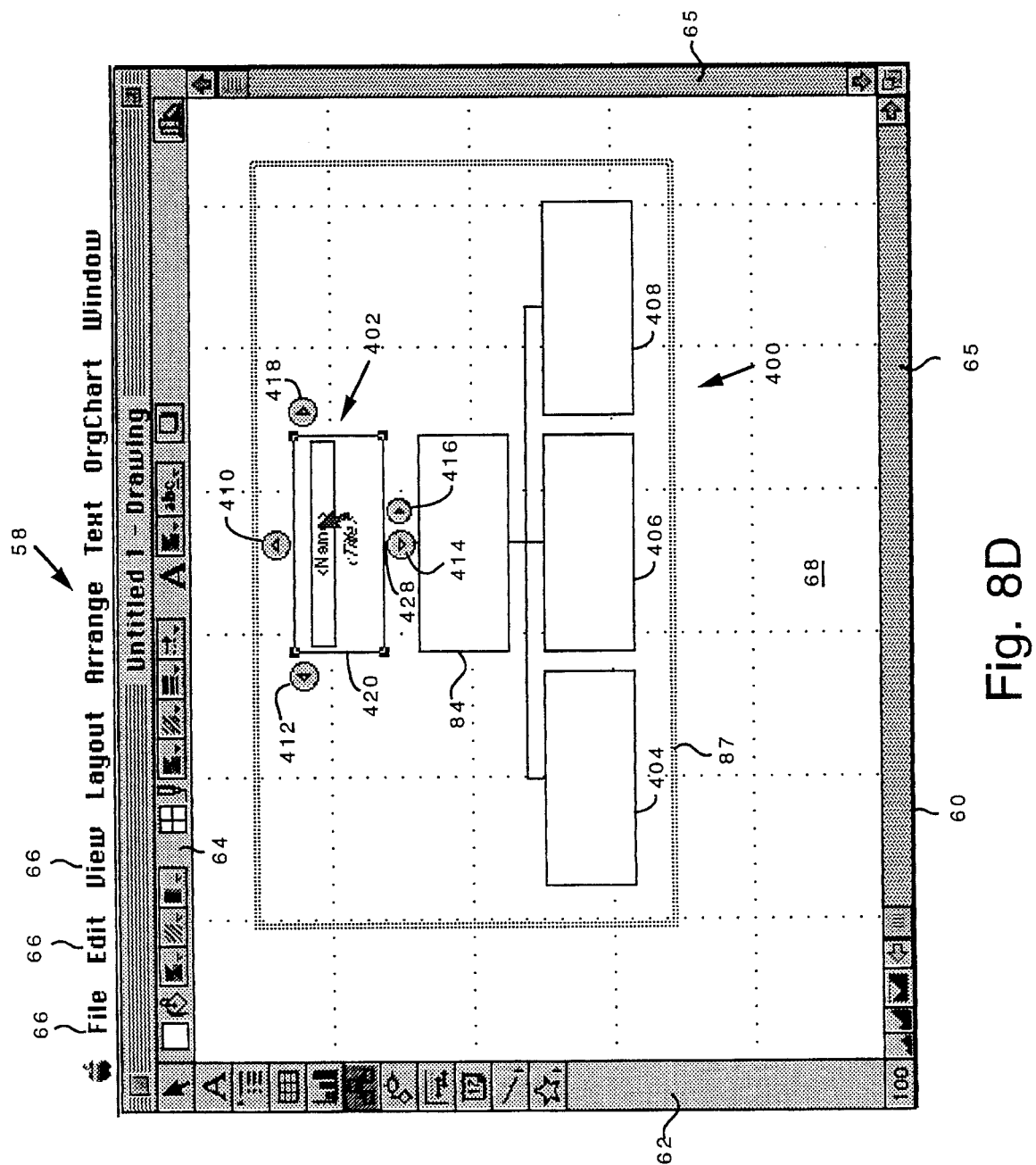

FIG. 8D is a graphical representation of the automatic generation results of selecting the top button 410 of the second user interface 402 of FIG. 8A. The new element 420 is positioned above the selected element 84 as shown in FIG. 8C. The new connector 428 is added connected between the new element 420 and the selected element 84. The method then executes steps 274, 208, and 210 to determine that the second automatic generation interface 402 is displayed about the new element 420 as shown in FIG. 8D.

Figure 8E:
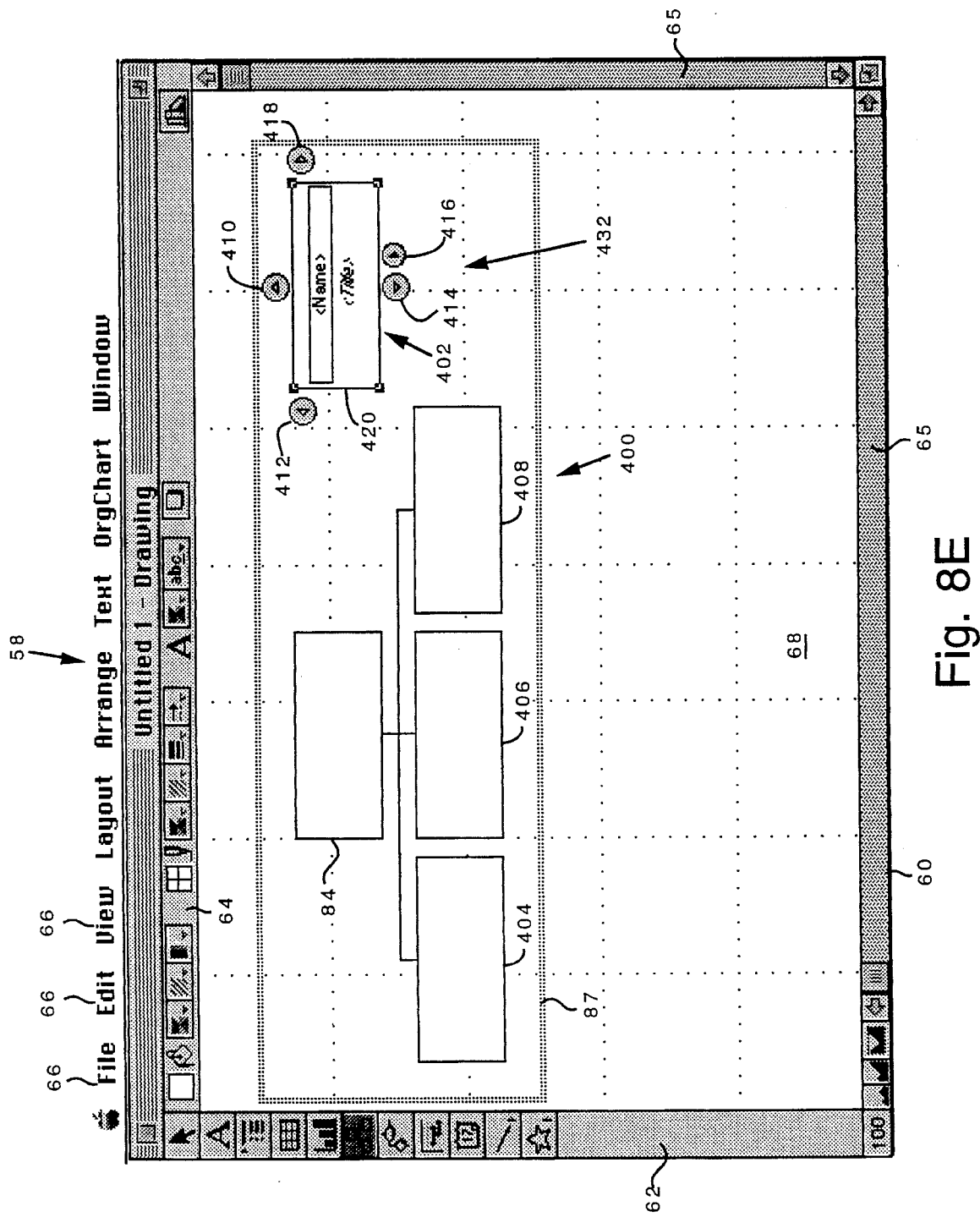

FIG. 8E is a graphical representation of the automatic generation results of selecting the first level right button 418 of the second user interface 402 of FIG. 8A. The first level left button 412 operates in a similar manner to the first level right button 418 except that the new chart would be positioned to the left of the existing chart 400. As shown in FIG. 8E, selection of first level right button 418 produces a new organizational chart 432. The new organizational chart 432 is positioned the default distance to the right of the rightmost element 408 of the existing chart 400. The new chart 432 includes a single element 420 and the element is vertically positioned at the same level as the first level of the existing chart 400. The new element 420 of the new chart is then set to be the selected element and the corresponding automatic generation user interface 402 is displayed about the new element 420.

Figure 9A:
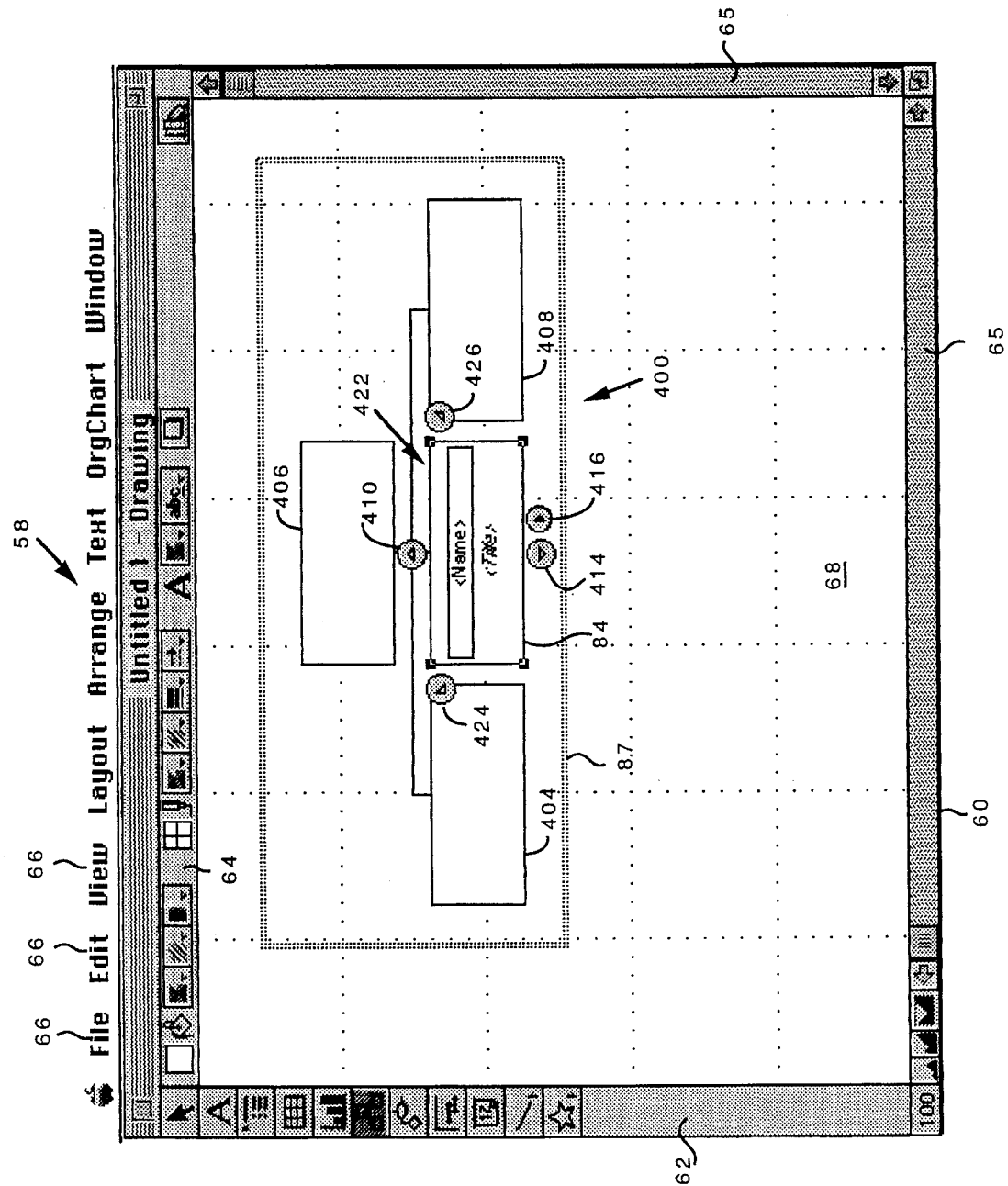
FIG. 9A is a graphical representation of the display device showing a third automatic generation user interface for organizational charts.

Referring now to FIGS. 9A–9E, the operation of the preferred method for creating elements of an organizational chart using the third automatic generation user interface 422 is described. The differences between FIG. 9A and FIGS. 9B–9E illustrate the results of selection of the directional control buttons 410, 424, 414, 416 and 426 and operation of the present invention. For ease of understanding like reference numerals as used for FIGS. 8A–8E have been used for like elements in FIGS. 9A–9E. FIG. 9A illustrates the exemplary organizational chart 400 that comprises the selected element 84, a first existing element 404, a second existing element 406 and a third existing element 408. In this instance, the second existing element 406 is at the first level of the organizational chart 400, with the first, third and selected elements 404, 408 and 84 one level below. The third automatic generation user interface 422 is displayed about the selected element 84, and the interface 422 comprises the top button 410, the left button 424, the bottom button 414, the assistant button 416 and the right button 426.

Figure 9B:
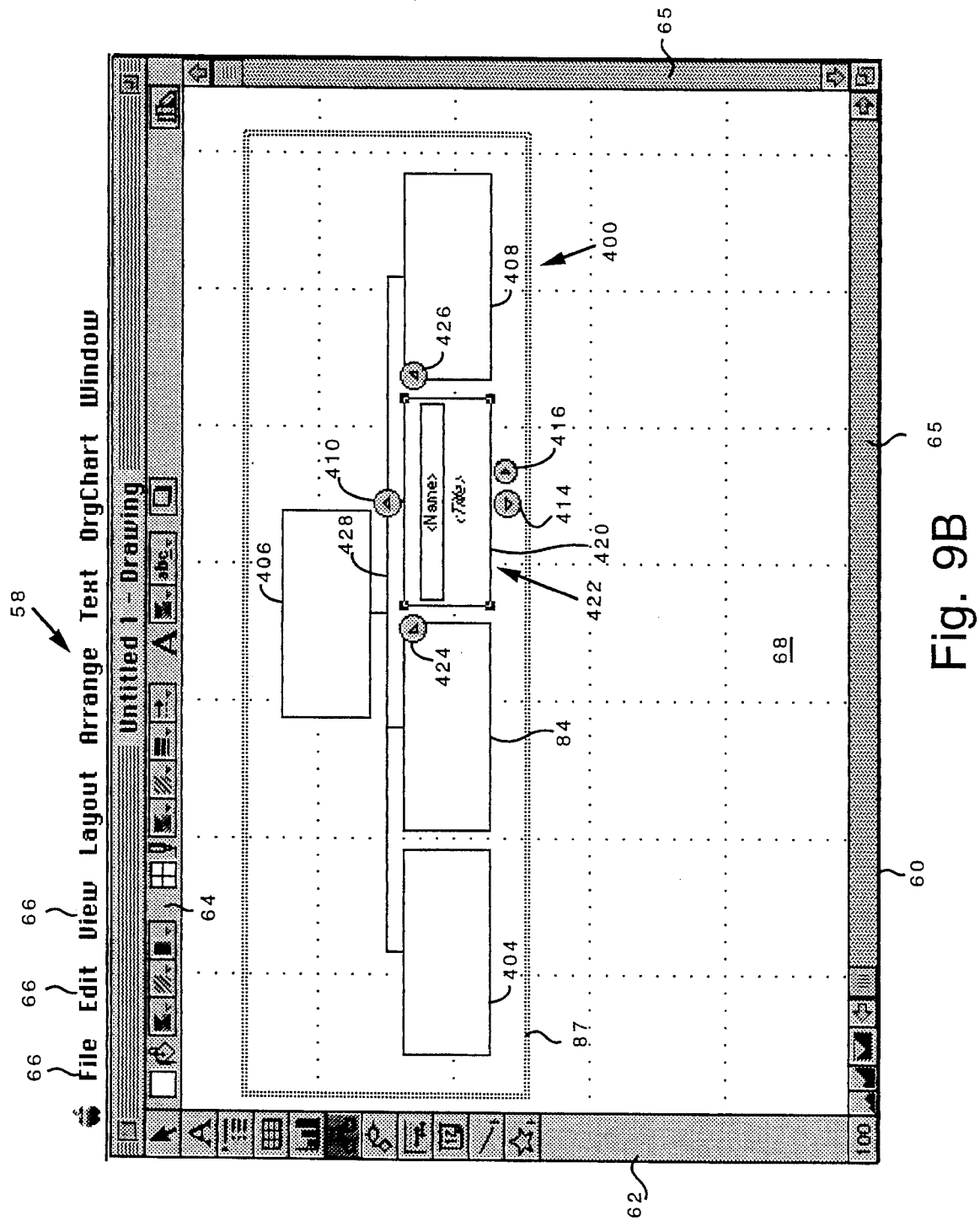
FIGS. 9B, 9C, 9D and 9E resulting organizational charts produced by use of the third automatic generation user interface.
Figure 10A:
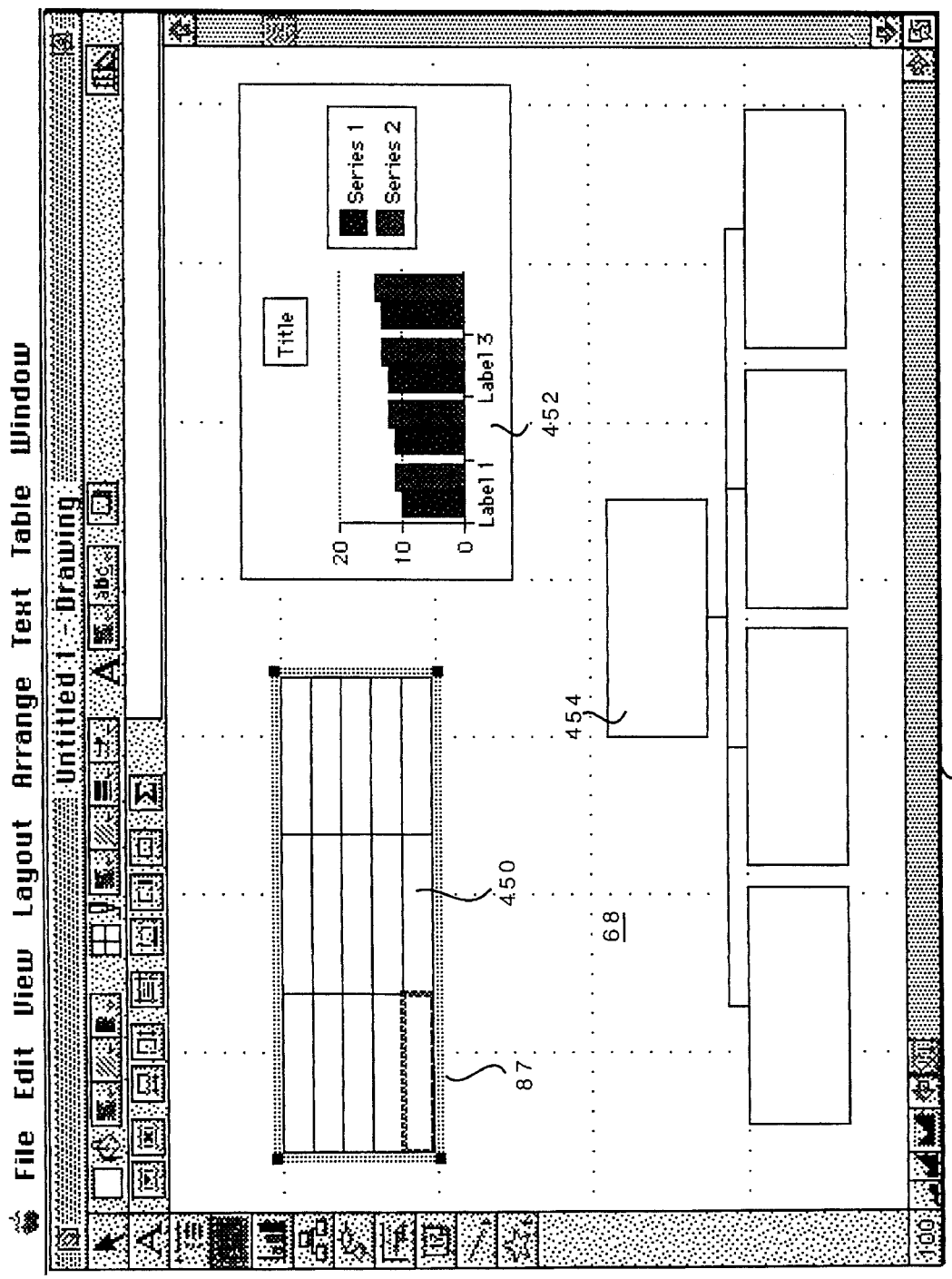
FIGS. 10A, 10B and 10C are a graphical representations of the display device showing a table, a bar chart, a organizational chart displayed in a visually distinct manner to delineate each as active frame in accordance with the present invention.
Figure 10B:
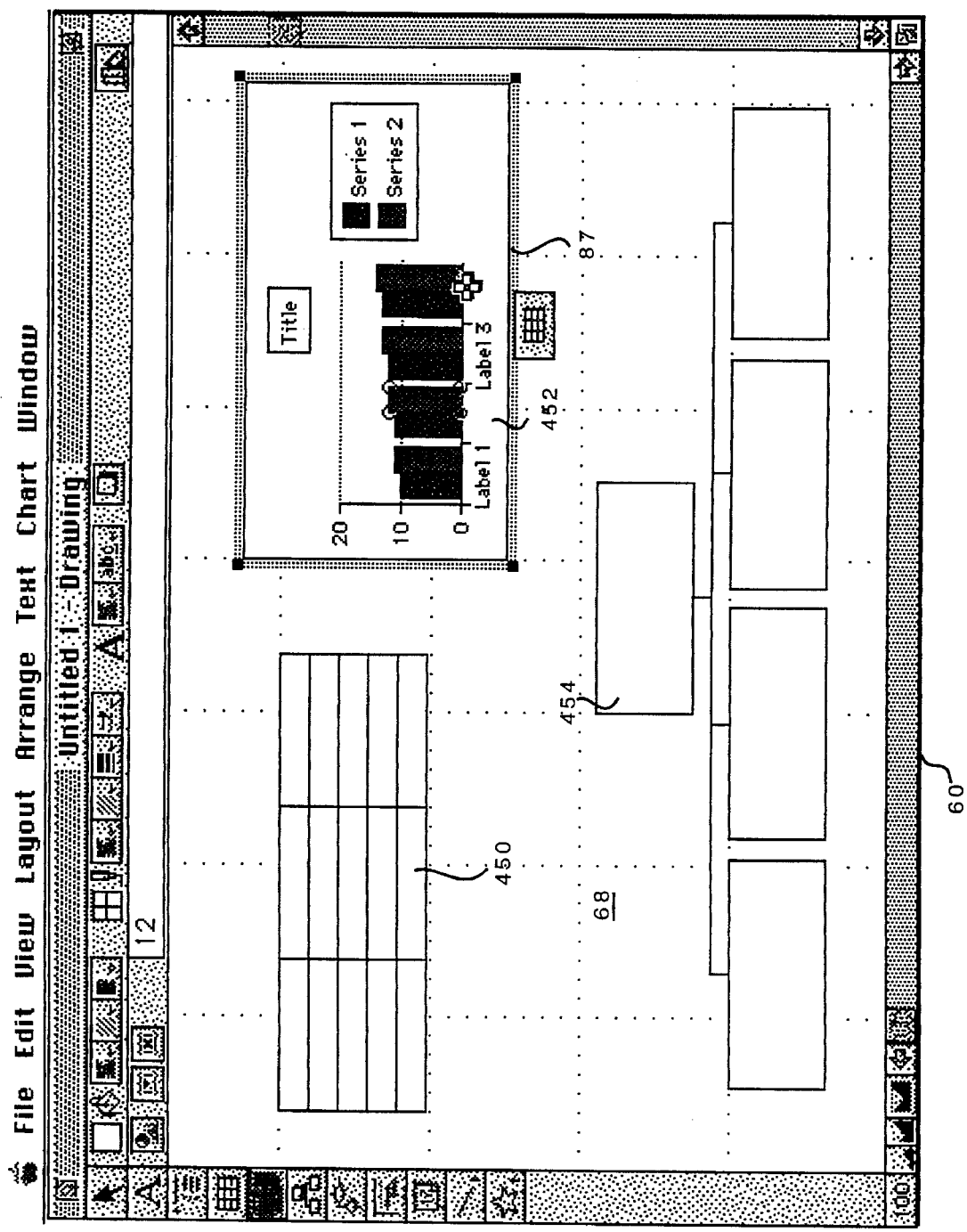
Figure 10C:
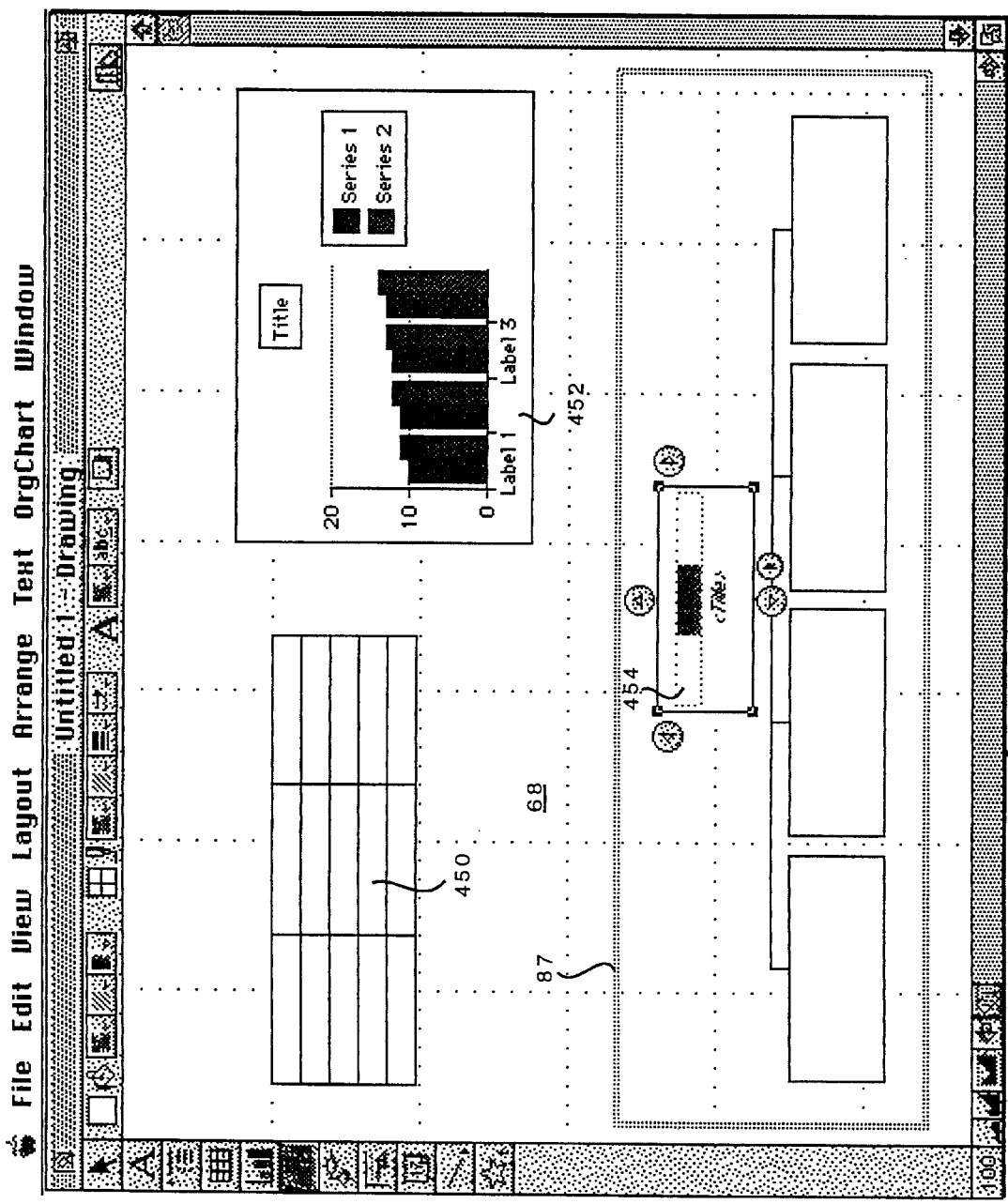

FIG. 9B is a graphical representation of the automatic generation results of selecting the right button 426 of the third user interface 422 of FIG. 9A. The left button 424 operates in a similar manner to the right button 426 except that the new element is positioned to the left of the selected element 84. As shown in FIG. 9B, selection of right button 426 produces the new element 420. The existing element 408 in the selected direction (right) is moved in the selected direction to provide space to add the new element 420. The new element 420 is then added between the selected element 84 and the existing element 408. Then a new connector 428 is added coupled between the new element 420 and the parent 406 of the selected element 84. The elements 404, 84, 408, 420 having the same level as the new element 420 are then moved horizontally to center them, while maintaining their respective spacing, below the common parent element 406, as shown in FIG. 9B. The new element 420 is then set to be the selected element and the corresponding automatic generation user interface 422 is displayed about the new element 420.

Figure 9C:
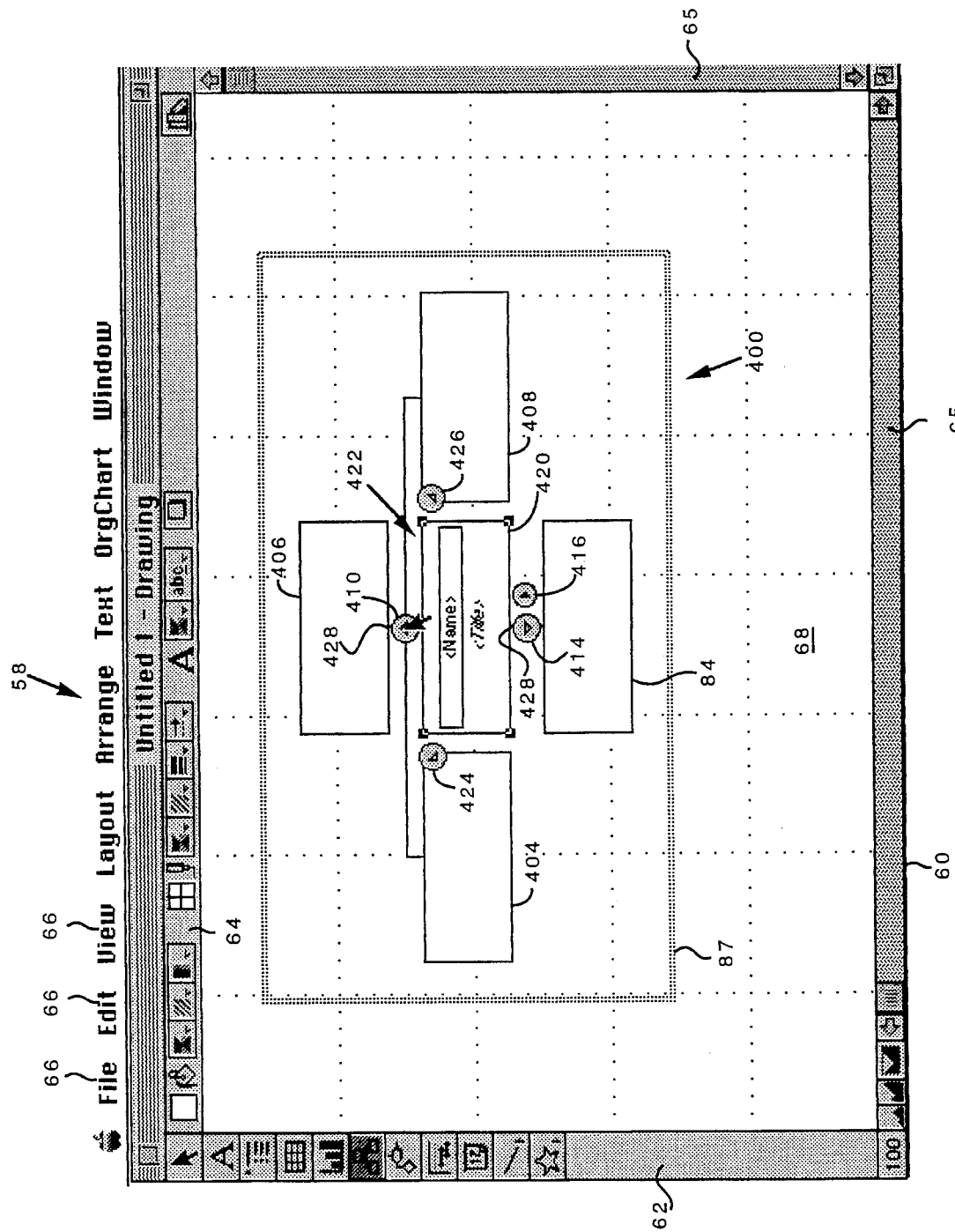

FIG. 9C is a graphical representation of the automatic generation results of selecting the top button 410 of the third user interface 422 of FIG. 9A. The existing element 406 in the selected direction (up) and the elements 404, 408 already connected to the existing element 406 are moved upward to provide space to position the new element 420 above the selected element 84 and below existing element 406. The new element 420 is generated and positioned above the selected element 84 and below the element 406 as shown in FIG. 9C. The existing connector between the selected element 84 and existing element 406 is deleted. A new connector 428 is connected between the new element 420 and the selected element 84. Another new connector 428 is connected between the new element 420 and the existing element 406. The method then displays the third user interface 422 about the new element 420 as shown in FIG. 9C.

Figure 9D:
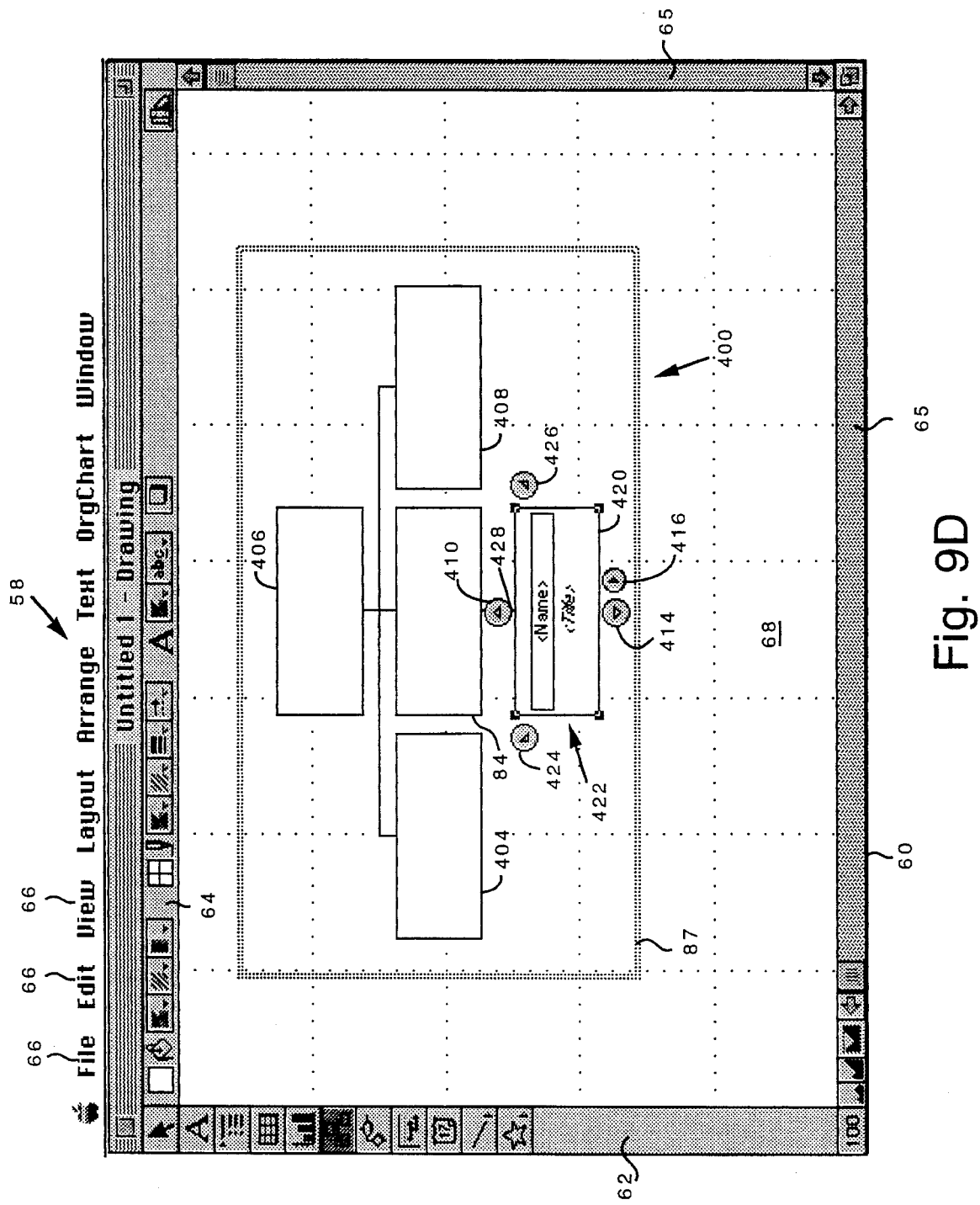

FIG. 9D is a graphical representation of the automatic generation results of selecting the bottom button 414 of the third user interface 422 of FIG. 9A. No elements exist in the selected direction, so none need to be moved. The new element 420 is added at the default distance beneath the selected element 84. The new connector is added between the selected element 84 and the new element 420 as shown. Then the third automatic generation user interface 422 is displayed about the new element 420.

Figure 9E:
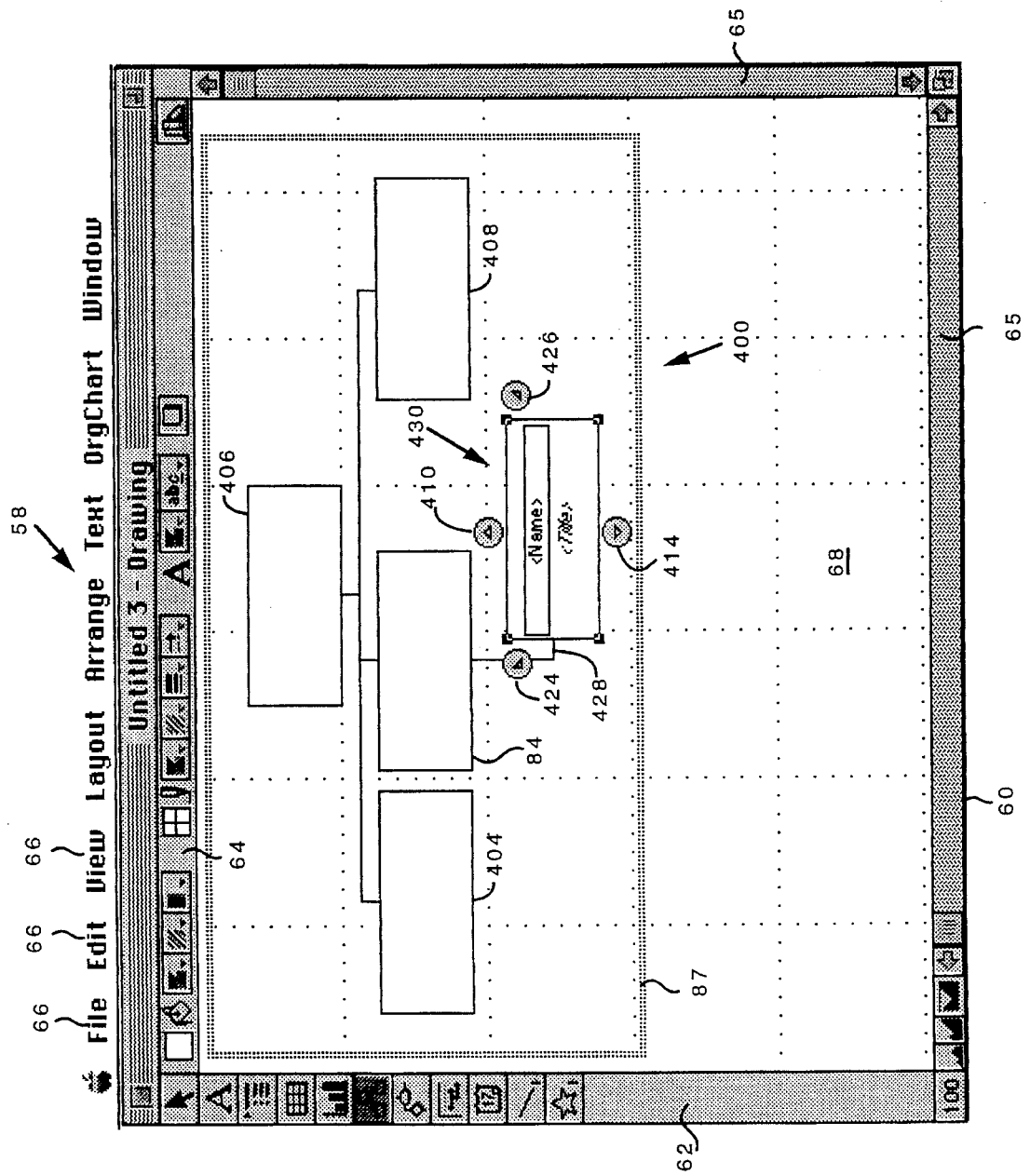

Finally, FIG. 9E is a graphical representation of the automatic generation results of selecting the assistant button 416 of the third user interface 422 of FIG. 9A. The existing element 408 in the selected direction is moved to the right to provide space to position the new assistant element 420 below the selected element 84. For assistant elements, the selected direction is both down and left. The new assistant element 420 is positioned below and to the left of the center of the selected element 84 as shown in FIG. 9E. A new connector 428 is added connected between the new element 420 and the selected element 84. When step 290 is executed, the elements 404, 84, 420 and 408 are centered below existing element 406 as shown in FIG. 9E. The method then executes steps 274, 208, 212 and 216 to determine that the fourth automatic generation interface 430 is displayed about the new element 420 as shown in FIG. 8C.

Referring now to FIG. 5, the preferred method for displaying the active frame 87 in a visually distinct manner will be described. The preferred method begins in step 300 with the user selecting an area of the display such as by positioning the mouse cursor over at a position in the drawing portion 68 of the window 60 and depressing the mouse button. Then in step 302, the method determines the position in the window 60 corresponding to the selection. The method the determines the frame or drawing type that extends over the position in the window 60 corresponding to the selection in step 304. Since there may be more than one frame that extends over a give area, the present invention provides a default ordering, stored in the default settings 48, for selecting between frames in the event more than one extends over the give area. Using this default ordering, the position in the window 60 where the input device 24 was selected and the extents of the frames, a single frame can be selected as the active frame 87. Next in step 306, the vertical and horizontal extents or bounds of the active frame 87 are determined. By reading and determining the elements forming the active frame 87 and their vertical and horizontal bounds, the overall bounds of the active frame 87 can be determined. For example, the vertical bounds are set as a default spacing plus distance between a top of an uppermost drawing element associated with the active frame 87 and a bottom of a lowermost drawing element associated with the identified frame; and a the horizontal bounds are set as a default spacing plus distance between a left side of a leftmost drawing element associated with the identified frame and a right side of a rightmost drawing element associated with the identified frame. Then in step 308, the present invention displays the boundary for the active frame 87 in a visually distinct manner. In an exemplary embodiment shown in FIGS. 10A–10C, the visually distinct manner is a set of parallel dotted lines in a generally rectangular shape about the active frame 87. Then in step 310, the processor is updated to activate the frame. The appropriate memories and registers are updated to make the elements forming the active frame 87 available. Then in step 312 the menus and functions provided by the system 20 are updated to correspond to the type of the active frame 87. The tool and functions provided by the system 20 may vary depending on the type of the frame that is active. Thus, these tools must be updated to correspond to the active frame 87 as the user switches between creating and editing different drawing types. Referring now to FIGS. 10A–10C, a graphical representation of the display device 22 presenting the window 60 with the drawing portion 68 is shown. Within the drawing portion 68, there is a table 450, a bar chart 452, an organizational chart 454. As shown once the user has selected the table 450, it becomes the active frame 87 and is displayed in the manner shown in FIG. 10A. FIG. 10B illustrates how the display is modified when the user selects the bar chart 452 for editing. Again, the present invention displays the active frame with the distinctive border to alert the user that the bar chart 452 is active. Similarly, when the organizational chart 454 is selected as the active frame, it shown as in FIG. 10C with distinctive border about the bounds of the organizational chart 454. This highlighting is particularly advantageous because it alerts the user to as the frame that is active. While the distinctive border identifying the active frame 87 of the present invention has been described above as being two parallel dotted lines, those skilled in the art will realize that the active frame 87 could be displayed in a variety of other ways to distinguish it from the other frame in the drawing window 68. Such other ways could included in reverse video, with a colored border or a border in other patterns.

While the present invention has been described with reference to certain preferred embodiments, those skilled in the art will recognize that various modifications may be provided. For example, the automatic generation user interface may also be adapted for use on pie charts, bar charts and other chart types provided in the charting and diagramming tools. These and other variations upon and modifications to the preferred embodiment are provided for by the present invention which is limited only by the following claims.

What is claimed is:

1. A system for automatically generating and positioning a new drawing element, the system comprising:
    a display device having an input;
    an input device having an output;
    a memory, having inputs and outputs, for storing data including
    a plurality of element records including an element type record,
    routines for creating and manipulating drawing elements, and
    a means for automatically generating and positioning a drawing element using an automatic generation user interface having
    representations of control buttons; and
    a processing unit responsive to the means for automatically generating, the processing unit coupled to the display device, the input device, and the memory.

2. The system of claim 1, wherein the memory further comprises:
    charting and diagramming means for presenting on the display device the automatic generation user interface having at least one directional control button.

3. The system of claim 2, wherein the charting and diagramming means also generates a new drawing element, moves existing drawing elements to provide space for the new element, and interconnects the new drawing element to existing drawing elements in response to selection of a directional control button.

4. The system of claim 1, wherein each of the element records further includes the position of the element, size of the element and information about the format, style and other characteristics for display of the element.

5. In a computer system for creating and manipulating drawings formed of drawing elements, a method for automatically generating and positioning a new drawing element, the method comprising the steps of:
    displaying, about a selected element, an automatic generation user interface having representations of control buttons;
    determining whether an automatic generation command is active; and
    if an automatic generation command is active, then generating and positioning the new drawing element.

6. The method of claim 5, wherein the automatic generation user interface includes at least one directional control button.

7. The method of claim 5, wherein the automatic generation user interface includes a first directional control button being displayed proximate the center of the top side of the selected element, a second directional control button being displayed proximate the center of the bottom side of the selected element, a third directional control button being displayed proximate the center of the right side of the selected element, and a fourth directional control button being displayed proximate the center of the left side of the selected element.

8. The method of claim 7, further comprising the steps of:
    determining whether the level of the selected object is a top level;
    generating a new chart if the level of the selected object is a top level and one from the group of the third and fourth directional control buttons was selected; and wherein the step of generating is performed such that the new element is generated for the new chart.

9. The method of claim 7, wherein the automatic generation user interface includes a fifth directional control button being displayed below and right of center of the bottom side of the selected element.

10. The method of claim 7, wherein the step of determining is performed by testing whether any one of the first, second, third and fourth directional control buttons has been selected.

11. The method of claim 7, wherein the step of displaying an automatic generation user interface about the selected element comprises the steps of:

testing whether the selected element is on a first level;

displaying a first user interface if the selected element is on the first level;

testing whether the selected element is on an assistant level;

displaying a second user interface about the selected object if the selected element is on an assistant level; and displaying a third user interface about the selected object if the selected element is not a first level and not on an assistant level.

12. The method of claim 7, wherein the step of generating a new drawing element comprises the steps of:

determining a default type and size for the new element;

producing a new drawing element having a type and size like the determined default type;

determining a default distance of spacing between the new element and the selected element; and positioning the new element at a default distance from the selected element.

13. The method of claim 12, wherein the step of positioning the new element comprises the steps of:

determining the control button that was selected;

positioning the new element at the default distance above the selected element if the first directional control button was selected;

positioning the new element at the default distance below the selected element if the second directional control button was selected;

positioning the new element at the default distance to the right of the selected element if the third directional control button was selected; and positioning the new element at the default distance to the left of the selected element if the fourth directional control button was selected.

14. The method of claim 5, further comprising the step of generating a connecting line between the new drawing element and the selected element if the automatic generation command was input.

15. The method of claim 14, wherein the step of generating a connecting line comprises the steps of:

determining a default connector type for the connecting line; and producing connecting line having a type like the determined default type.

16. The method of claim 14, further comprising the steps of:

determining whether the input automatic generation command was a multiple generation command; and, if the automatic generation command was a multiple generation command, then displaying a multiple element generation interface;

receiving an input as to the number of elements to be automatically generated; and producing the number of additional elements inputs.

17. The method of claim 16, further comprising the step of, if the automatic generation command was a multiple generation command, then producing the number of additional connecting lines between the additional elements.

18. The method of claim 5, further comprising the step of:

determining from the automatic generation command a selected direction in which the new element is to be positioned;

determining whether there are any existing elements in the selected direction; and identifying any existing elements in the selected direction from the selected element;

moving the existing elements determined to be in the selected direction a predetermined distance in the selected direction.

19. The method of claim 18, wherein the predetermined distance is equal to the distance of the default spacing plus the extent of the new element in the selected direction.

20. The method of claim 18, wherein the predetermined distance is determined by the default spacing and the default connector type.

21. The method of claim 18, further comprising the steps of:

determining whether any existing elements in the selected direction are connected to the selected element;

identifying any existing elements in the selected direction that are connected to the selected element;

deleting the connection between the selected element and identified existing elements in the selected direction; and producing additional connecting lines between the new element and the identified existing elements.

22. In a computer system for creating and manipulating drawings formed of drawing elements, a method for automatically generating and positioning a new drawing element, the method comprising the steps of:

receiving a selection of an element;

displaying an automatic generation user interface about the selected element;

determining whether an automatic generation command has been input;

identifying the position of a cursor on a display device;

displaying a phantom element at the identified cursor position and a connecting line coupled between the phantom element and the selected element;

determining whether a drop element command has been input; and, if the drop element command was input, then generating the new drawing element; and generating a connecting line between the new drawing element and the selected element.

23. In a computer system having an input device and a processor, a computer implemented method for displaying drawing elements associated with an active frame in a visually distinct manner, the method comprising the steps of:

receiving as input a point on the display device of interest;

determining a position corresponding to the point;

identifying a frame that extends over the determined position;

determining vertical and horizontal bounds of the identified frame; and displaying a boundary around the identified frame.

24. The method of claim 23, wherein a default ordering of the frames is provided, and the default ordering is used to identify the frame that extends over the determined position if more than one frame extends over the determined position.

25. The method of claim 23, wherein the step of determining vertical and horizontal bounds comprises the steps of:

determining the drawing elements associated with the identified frame;

determining the vertical and horizontal extent of each element;

setting the vertical bounds as a default spacing plus the distance between a top of an uppermost drawing element associated with the identified frame and a bottom of a lowermost drawing element associated with the identified frame; and setting the horizontal bounds as a default spacing plus the distance between a left side of a leftmost drawing element associated with the identified frame and a right side of a rightmost drawing element associated with the identified frame.

26. The method of claim 23, wherein the step of displaying a boundary comprises displaying a pair of parallel dotted lines in a generally rectangular shape about the bounds of the identified frame.

* * * * *